United States Patent
Kahn et al.

(10) Patent No.: US 7,535,492 B2
(45) Date of Patent: May 19, 2009

(54) IMAGING SYSTEM PROVIDING AUTOMATED FULFILLMENT OF IMAGE PHOTOFINISHING BASED ON LOCATION

(75) Inventors: Philippe R. Kahn, Scotts Valley, CA (US); Eric O. Bodnar, Santa Cruz, CA (US); Paul A. Egli, Scotts Valley, CA (US); Brian Bodmer, Santa Cruz, CA (US); Shekhar Kirani, Capitola, CA (US); Mark Tarantino, Santa Cruz, CA (US)

(73) Assignee: Lightsurf Technologies, Inc., Santa Cruz, CA (US)

( * ) Notice: Subject to any disclaimer, the term of this patent is extended or adjusted under 35 U.S.C. 154(b) by 853 days.

(21) Appl. No.: 10/190,234

(22) Filed: Jul. 2, 2002

(65) Prior Publication Data

US 2004/0004737 A1    Jan. 8, 2004

(51) Int. Cl.
  *H04N 5/232* (2006.01)
  *H04N 5/225* (2006.01)
  *H04N 7/14* (2006.01)

(52) U.S. Cl. ............... 348/211.1; 348/211.3; 348/207.1; 348/14.02; 455/456.1; 455/456.3

(58) Field of Classification Search ............... 348/211.1, 348/211.2, 211.3, 207.1, 207.99, 14.02; 455/456.1, 455/456.3
See application file for complete search history.

(56) References Cited

U.S. PATENT DOCUMENTS

| 5,633,678 | A | 5/1997 | Parulski et al. | |
|---|---|---|---|---|
| 6,321,231 | B1 | 11/2001 | Jebens et al. | 707/104 |
| 6,332,146 | B1 | 12/2001 | Jebens et al. | 707/104 |
| 6,741,864 | B2* | 5/2004 | Wilcock et al. | 348/207.99 |
| 7,016,899 | B1* | 3/2006 | Stern et al. | 707/10 |
| 2002/0044690 | A1 | 4/2002 | Burgess | |
| 2002/0140978 | A1* | 10/2002 | Urabe et al. | 358/1.16 |
| 2002/0143769 | A1* | 10/2002 | Tecu et al. | 707/10 |
| 2003/0032435 | A1* | 2/2003 | Asada et al. | 701/200 |
| 2003/0202104 | A1* | 10/2003 | Werner | 348/207.99 |

FOREIGN PATENT DOCUMENTS

| GB | 2312535 A | 10/1997 |
|---|---|---|
| JP | 2001235790 | 8/2001 |

OTHER PUBLICATIONS

PCT search report mailed Feb. 17, 2005 for International application No. PCT/US03/20775.

* cited by examiner

*Primary Examiner*—Nhan T Tran
(74) *Attorney, Agent, or Firm*—Blakely, Sokoloff, Taylor & Zafman, LLP; Judith A. Szepesi

(57) ABSTRACT

An imaging system is described that automates fulfillment of image photofinishing based on location. The system includes the following components: an imaging device capable of capturing a plurality of images; a local host, at least occasionally connected to the imaging device, that is capable of offloading images from the imaging device and capable of determining a current position based on GPS (Global Positioning System) information; and a remote (e.g., Web-based) host capable of receiving the plurality of images, capable of receiving a request for photofinishing the images, and capable of transmitting the plurality of images to a particular fulfiller for photofinishing, based on the current position.

47 Claims, 16 Drawing Sheets

Glossary for J2ME App

Yes- Confirms action and takes user to next screen
No- Cancels action and takes user back to previous screen
OK- Confirms action and takes user to next screen
Done- Completes task and takes user to initial page
Cancel- Cancels action and takes user to previous screen
Exit- Exits application
Upload- Initiates transfer of selected photo to user's account
Upload All- Initiates transfer of all photos to user's account
Delete- Removes selected photo from camera
Delete All- Removes all photos from camera
Preview- View photos in camera
Share- Closes J2ME app and launches to user's WAP account
Next- Displays next photo
Prev- Displays previous photo

FIG. 5G

IMAGING SYSTEM PROVIDING AUTOMATED FULFILLMENT OF IMAGE PHOTOFINISHING BASED ON LOCATION

RELATED APPLICATIONS

The present application is related to the following commonly-owned, concurrently-filed application: application Ser. No. 10/190,373, filed Jul. 2, 2002, entitled "Imaging System Providing Automatic Organization and Processing of Images Based on Location". The disclosure of the foregoing application is hereby incorporated by reference in its entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to digital image processing and, more particularly, to improved techniques for the organization and processing (e.g., photofinishing) of digital images based on information indicating where the images were captured and/or where the user is presently located.

2. Description of the Background Art

Today, digital imaging, particularly in the form of digital cameras, is a prevalent reality that affords a new way to capture photos using a solid-state image sensor instead of traditional film. A digital camera functions by recording incoming light on some sort of sensing mechanism and then processes that information (basically, through analog-to-digital conversion) to create a memory image of the target picture. A digital camera's biggest advantage is that it creates images digitally thus making it easy to transfer images between all kinds of devices and applications. For instance, one can easily insert digital images into word processing documents, send them by e-mail to friends, or post them on a Web site where anyone in the world can see them. Additionally, one can use photo-editing software to manipulate digital images to improve or alter them. For example, one can crop them, remove red-eye, change colors or contrast, and even add and delete elements. Digital cameras also provide immediate access to one's images, thus avoiding the hassle and delay of film processing. All told, digital photography is becoming increasingly popular because of the flexibility it gives the user when he or she wants to use or distribute an image.

The defining difference between digital cameras and those of the film variety is the medium used to record the image. While a conventional camera uses film, digital cameras use an array of digital image sensors. When the shutter opens, rather than exposing film, the digital camera collects light on an image sensor, a solid-state electronic device. The image sensor contains a grid of tiny photosites that convert light shining on them to electrical charges. The image sensor may be of the charged-coupled device (CCD) or complementary metal-oxide semiconductor (CMOS) variety. Most digital cameras employ charge-coupled device (CCD) image sensors, but newer cameras are using image sensors of the complimentary metal-oxide semiconductor (CMOS) variety. Also referred to by the acronym CIS (for CMOS image sensors), this newer type of sensor is less expensive than its CCD counterpart and requires less power.

In addition to recording images themselves, prior art imaging devices have only been able to record information about the date/time (timestamp) that an image was captured but not information about the location where the image was captured. In other words, these devices can record information about "when" but not information about "where." Recently, telecommunication providers, such as QUALCOMM, have come out with phones that are capable of determining a user's location. The approach employs a combination of the existing GPS (Global Positioning System) satellites and the existing cellular networks.

Global Positioning System (GPS) is a worldwide radio-navigation system formed from a constellation of 24 satellites whose paths are monitored by ground stations. GPS uses these "man-made stars" as reference points to calculate positions accurate to a matter of meters. Each satellite generates radio signals that allow a GPS receiver to estimate the satellite location and distance between the satellite and the receiver. The receiver uses the measurements to calculate where on the Earth a user is located. GPS receivers have been miniaturized to just a few integrated circuits. As a result, GPS technology is becoming very economical, making it accessible to virtually everyone. Therefore, in addition to connecting a camera or other media capture device to a phone, a user may now connect the camera to a GPS-enabled phone that knows the user's location.

The current cellular network may also help determine where a user is presently located. A cellular network basically comprises a set of limited range antennas. In use, a cellular phone transmits signals to the nearest antenna, for determining what "cell" or antenna area the phone is currently operating in. QUALCOMM can now convert cell phones into mobile Global Positioning System devices by adapting emergency-tracking technology for display on individual phone screens. QUALCOMM's gpsOne positioning technology uses A-GPS, or "assisted GPS," which is a form of location detection in which cell phone towers help GPS satellites fix a cell phone caller's position. Under control of SnapTrack software, the gpsOne hardware may serve location information to client devices such as cell phones, wireless personal digital assistants, or other wireless instruments. SnapTrack software is available from SnapTrack, Inc., a subsidiary of QUALCOMM.

Although both digital cameras and GPS receivers are now ubiquitous in use, there presently is no automatic way for a user to determine where a picture is actually taken. The act of taking a picture may be thought of as recording a "memory," that is, an instance in time that a user wants to remember. Apart from the picture image data itself, the memory actually has two attributes: a time and a place. Presently, it is easy to record the time when a picture is taken. However, there has today been no easy way to record the place where the picture is taken. Although the user may manually enter information about where the picture is taken, there is no automated technique available that will do this task automatically. In other words, the user would like to know "where" and "when" his or her pictures are taken. Up until now, only the task of determining the "when" has been performed automatically.

The problem of not knowing where one's pictures were taken has obvious disadvantages. Consider, for example, a user returning from a trip (e.g., European vacation). He or she may not recall exactly where each individual picture was taken. Or consider a real estate agent who takes pictures of several different properties, including ones that are simply vacant lots. Without location information, the real estate agent faces a difficult task of determining which picture goes with which property. All told, without some means of identifying where a picture is taken, users often find it difficult to distinguish the true location for a picture, and therefore difficult to distinguish the exact subject matter of the picture. The current state of the art has been for the user to manually capture this information, but that approach is at best a very tedious solution to the problem. Accordingly, most users simply do without location information and thus routinely face the problem that they are not able to determine the location where pictures were taken. And the older the pictures are, the more difficult this task becomes. Without knowing the location where pictures were taken, the user has a more difficult task of organizing those pictures (e.g., into a photo album) to facilitate viewing. A better solution is needed.

GLOSSARY

The following definitions are offered for purposes of illustration, not limitation, in order to assist with understanding the discussion that follows.

BREW: BREW (Binary Runtime Environment for Wireless) is QUALCOMM'S (San Diego, Calif.) open source application development platform for wireless devices equipped for code division multiple access (CDMA) technology. BREW makes it possible for developers to create portable applications that will work on any handsets equipped with CDMA chipsets. Because BREW runs in between the application and the chip operating system software, the application can use the device's functionality without the developer needing to code to the system interface or even having to understand wireless applications. Users can download applications—including text chat, enhanced e-mail, location positioning, games (both online and offline), and Internet radio—from carrier networks to any BREW-enabled phone. BREW is competing for wireless software market share with J2ME (Java 2 Micro Edition), a similar platform from Sun Microsystems.

J2ME: Short for "Java 2 Platform Micro Edition," J2ME is Sun Microsystems' (Mountain View, Calif.) consumer wireless device platform. J2ME allows developers to use Java and the J2ME wireless toolkit to create applications and programs for wireless and mobile devices. J2ME consists of two elements: configurations and profiles. Configurations provide a set of libraries and a virtual machine for a category of wireless devices. There are two configurations for J2ME, one for fixed wireless devices and one for mobile wireless devices. Profiles are APIs built on top of configurations to provide a runtime environment for a specific device, such as a PDA, cell phone, or set-top box. The profile manages the application, user interface, networking, and I/O. In order to support Java apps, manufacturers need to implement a profile for their specific devices.

SMS: SMS (Short Message Service) is a service for sending messages of up to 160 characters (224 characters if using a 5-bit mode) to mobile phones that use Global System for Mobile (GSM) communication. SMS is similar to paging. However, SMS messages do not require the mobile phone to be active and within range and will be held for a number of days until the phone is active and within range. SMS messages are transmitted within the same cell or to anyone with roaming service capability. They can also be sent to digital phones from a Web site equipped with PC Link or from one digital phone to another.

WAP: Short for the Wireless Application Protocol, a secure specification that allows users to access information instantly via handheld wireless devices such as mobile phones, pagers, two-way radios, "smart" phones, and communicators. WAP uses WML or "Wireless Markup Language" which is a tag-based display language providing navigational support, data input, hyperlinks, text and image presentation, and forms; it is a browsing language similar to Internet HTML. WAP supports most wireless networks, including CDMA and GSM. The WAP 2.0 specification is available from Open Mobile Alliance, Ltd.

SUMMARY OF THE INVENTION

An imaging system is described that automates fulfillment of image photofinishing based on location. In one embodiment, for example, the system includes the following components: an imaging device capable of capturing a plurality of images; a local host, at least occasionally connected to the imaging device, that is capable of offloading images from the imaging device and capable of determining a current position based on GPS (Global Positioning System) information; and a remote (e.g., Web-based) host capable of receiving the plurality of images, capable of receiving a request for photofinishing the images, and capable of transmitting the plurality of images to a particular fulfiller for photofinishing, based on the current position.

Methods are described that automate fulfillment of image photofinishing based on location. In one embodiment, for example, the method includes the following steps. First, images are captured at an imaging device. Next, a request is received for photofinishing the images. Using GPS information and a database of potential fulfillers, the method automatically determines one or more fulfillers that are at a location appropriate for the user. One of the fulfiller(s) is selected. The images are transmitted to the selected fulfiller for photofinishing.

BRIEF DESCRIPTION OF THE DRAWINGS

FIG. 5G illustrates a glossary that corresponds to the dialog (menu) selections shown in FIGS. 5A-F.

DETAILED DESCRIPTION OF A PREFERRED EMBODIMENT

The following description will focus on the currently preferred embodiment of the present invention, which is implemented in a digital camera that includes occasional connectivity to a local host device (e.g., GPS-enabled cell phone, personal digital assistant (PDA), laptop computer, or the like). The present invention is not, however, limited to any one particular application or any particular environment. Instead, those skilled in the art will find that the system and methods of the present invention may be advantageously employed on a variety of different devices. Therefore, the description of the exemplary embodiment that follows is for purposes of illustration and not limitation.

I. Digital Camera-based Implementation

A. Basic Components of Digital Camera

Figure 1:
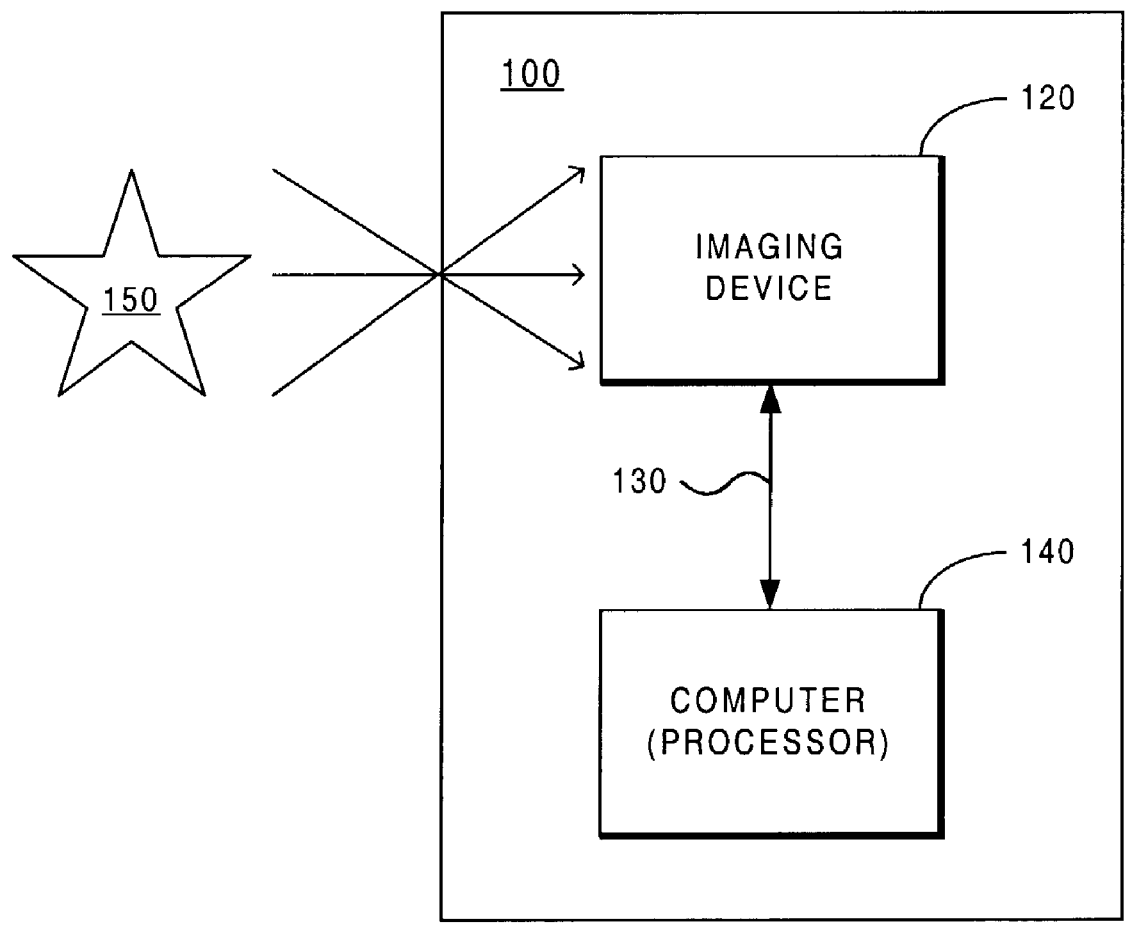
FIG. 1 is a very general block diagram of a digital camera suitable for implementing the present invention.

The present invention may be implemented on a media capturing and recording system, such as a digital camera. FIG. 1 is a very general block diagram of a digital camera 100 suitable for implementing the present invention. As shown, the digital camera 100 comprises an imaging device 120, a system bus 130, and a processor or computer 140 (e.g., microprocessor-based unit). Also shown is a subject or object 150 whose image is to be captured by the digital camera 100 (e.g., captured or recorded as a digital image, upon activation of a shutter mechanism). The general operation of these components of the digital camera 100 in capturing an image of the object 150 will now be described.

As shown, the imaging device 120 is optically coupled to the object 150 in the sense that the device may capture an optical image of the object. Optical coupling may include use of optics, for example, such as a lens assembly (not shown) to focus an image of the object 150 on the imaging device 120. The imaging device 120 in turn communicates with the computer 140, for example via the system bus 130. The computer 140 provides overall control for the imaging device 120. In operation, the computer 140 controls the imaging device 120 by, in effect, telling it what to do and when. For instance, the computer 140 provides general input/output (I/O) control that allows one to coordinate control of the imaging device 120 with other electromechanical peripherals of the digital camera 100 (e.g., flash attachment).

Once a photographer or camera user has aimed the imaging device 120 at the object 150 (with or without user-operated focusing) and, using a capture button or some other means, instructed the camera 100 to capture an image of the object 150, the computer 140 commands the imaging device 120 via the system bus 130 to capture an image representing the object 150. The imaging device 120 operates, in essence, by capturing light reflected from the object 150 and transforming that light into image data. The captured image data is transferred over the system bus 130 to the computer 140 which performs various image processing functions on the image data before storing it in its internal memory. The system bus 130 also passes various status and control signals between the imaging device 120 and the computer 140. The components and operations of the imaging device 120 and the computer 140 will now be described in greater detail.

B. Image Capture on Imaging Device

Figure 2A:
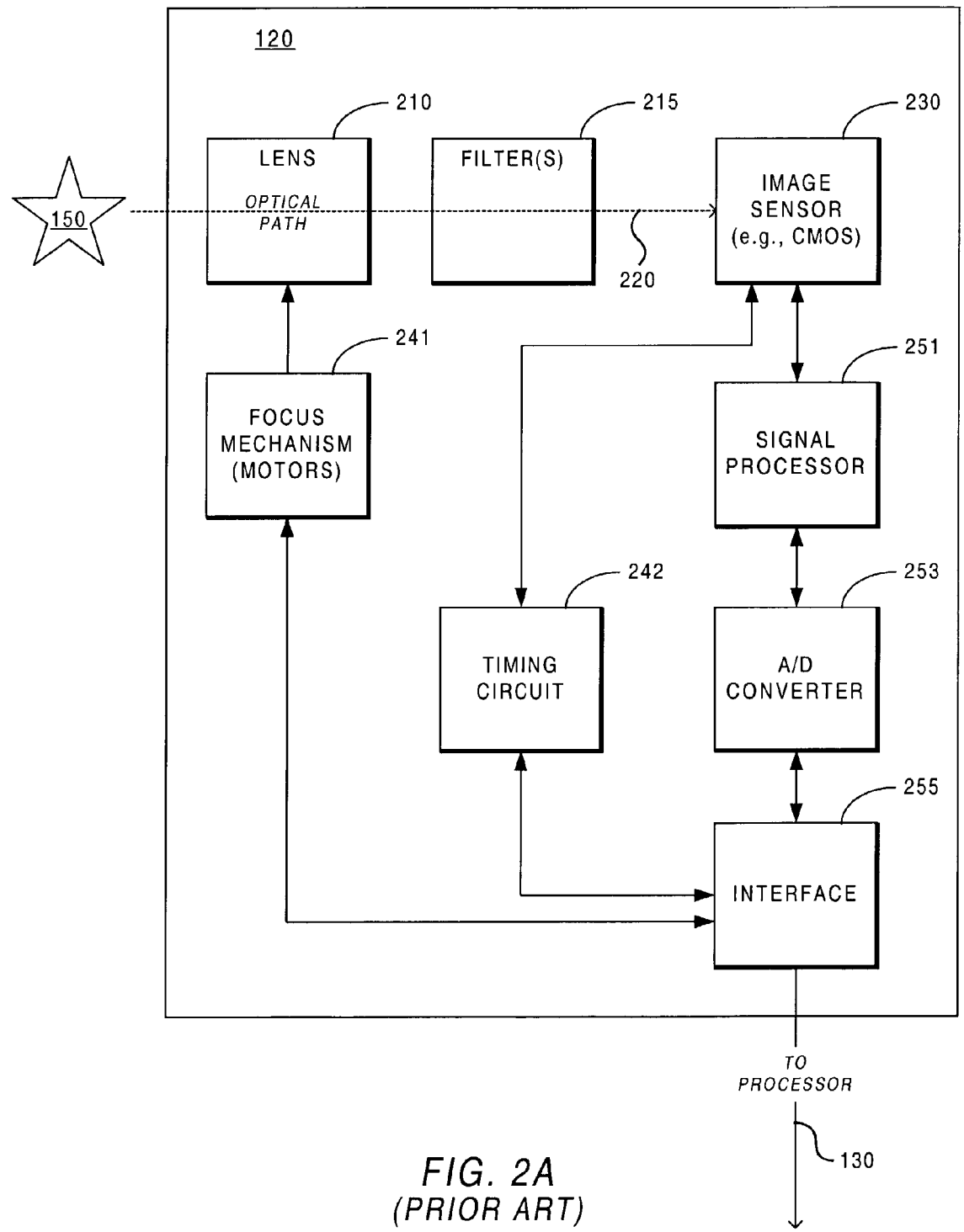
FIG. 2A is a block diagram of a conventional digital imaging device.

FIG. 2A is a block diagram of a conventional digital imaging device 120. As shown, the imaging device 120 comprises a lens 210 having an iris, one or more filter(s) 215, an image sensor 230 (e.g., CMOS, CCD, or the like), a focus mechanism (e.g., motors) 241, a timing circuit 242, a signal processor 251 (e.g., analog signal processor), an analog-to-digital (A/D) converter 253, and an interface 255. The operation of these components will now be described.

In operation, the imaging device 120 captures an image of the object 150 via reflected light impacting the image sensor 230 along optical path 220. The lens 210 includes optics to focus light from the object 150 along optical path 220 onto the image sensor 230. The focus mechanism 241 may be used to adjust the lens 210. The filter(s) 215 preferably include one or more color filters placed over the image sensor 230 to separate out the different color components of the light reflected by the object 150. For instance, the image sensor 230 may be covered by red, green, and blue filters, with such color filters intermingled across the image sensor in patterns ("mosaics") designed to yield sharper images and truer colors.

While a conventional camera exposes film to capture an image, a digital camera collects light on an image sensor (e.g., image sensor 230), a solid-state electronic device. The image sensor 230 may be implemented as either a charged-coupled device (CCD) or a complementary metal-oxide semiconductor (CMOS) sensor. Both CMOS and CCD image sensors operate by capturing light on a grid of small cells known as photosites (or photodiodes) on their surfaces. The surface of an image sensor typically consists of hundreds of thousands of photosites that convert light shining on them to electrical charges. Depending upon a given image, varying amounts of light hit each photosite, resulting in varying amounts of electrical charge at the photosites. These charges can then be measured and converted into digital information. A CCD sensor appropriate for inclusion in a digital camera is available from a number of vendors, including Eastman Kodak of Rochester, N.Y., Philips of The Netherlands, and Sony of Japan. A suitable CMOS sensor is also available from a variety of vendors. Representative vendors include STMicroelectronics (formerly VSLI Vision Ltd.) of The Netherlands, Motorola of Schaumburg, Ill., and Intel of Santa Clara, Calif.

When instructed to capture an image of the object 150, the image sensor 230 responsively generates a set of raw image data (e.g., in CCD format for a CCD implementation) representing the captured object 150. In an embodiment using a CCD sensor, for example, the raw image data that is captured on the image sensor 230 is routed through the signal processor 251, the analog-to-digital (A/D) converter 253, and the interface 255. The interface 255 has outputs for controlling the signal processor 251, the focus mechanism 241, and the timing circuit 242. From the interface 255, the image data passes over the system bus 130 to the computer 140 as previously illustrated at FIG. 1. The operations of the computer 140 in processing this image data will now be described.

C. Image Processing

Figure 2B:
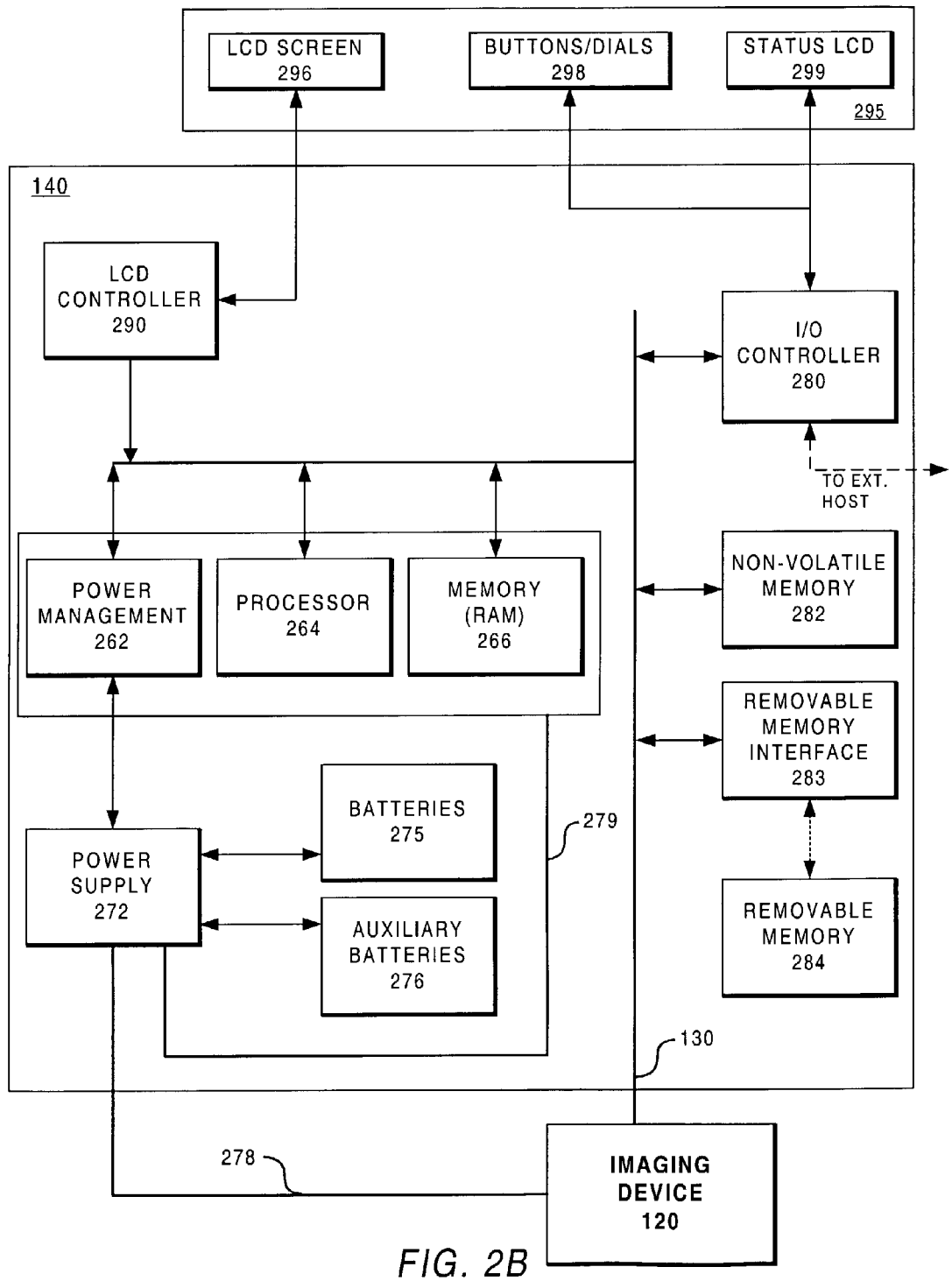
FIG. 2B is a block diagram of the processor or computer used for the digital imaging device of FIG. 2A.

A conventional onboard processor or computer 140 is provided for directing the operation of the digital camera 100 and processing image data captured on the imaging device 120. FIG. 2B is a block diagram of the processor or computer 140. As shown, the system bus 130 provides connection paths between the imaging device 120, an (optional) power management 262, a processor (CPU) 264, a random-access memory (RAM) 266, an input/output (I/O) controller 280, a non-volatile memory 282, a removable memory interface 283, and a liquid crystal display (LCD) controller 290. Removable memory 284 connects to the system bus 130 via the removable memory interface 283. Alternately, the camera 100 (and therefore the onboard computer 140) may be implemented without the removable memory 284 or the removable memory interface 283. The power management 262 communicates with the power supply 272. Also illustrated at FIG. 2B is a camera user interface 295 which is electrically connected to the LCD controller 290 and the input/output controller 280. Each of these components will now be described in more detail.

The processor (CPU) 264 typically includes a conventional processor device (e.g., microprocessor) for controlling the operation of camera 100. Implementation of the processor 264 may be accomplished in a variety of different ways. For instance, the processor 264 may be implemented as a microprocessor (e.g., MPC823 microprocessor, available from Motorola of Schaumburg, Ill.) with DSP (digital signal processing) logic blocks, memory control logic blocks, video control logic blocks, and interface logic. Alternatively, the processor 264 may be implemented as a "camera on a chip (set)" using, for instance, a Raptor II chipset (available from Conextant Systems, Inc. of Newport Beach, Calif.), a Sound Vision Clarity 2, 3, or 4 chipset (available from Sound Vision, Inc. of Wayland, Mass.), or similar chipset that integrates a processing core with image processing periphery. Processor 264 is typically capable of concurrently running multiple software routines to control the various processes of camera 100 within a multithreaded environment.

The digital camera 100 includes several memory components. The memory (RAM) 266 is a contiguous block of dynamic memory that may be selectively allocated to various storage functions. Dynamic random-access memory is available from a variety of vendors, including, for instance, Toshiba of Japan, Micron Technology of Boise, Id., Hitachi of Japan, and Samsung Electronics of South Korea. The non-volatile memory 282, which may typically comprise a conventional read-only memory or flash memory, stores a set of computer-readable program instructions to control the operation of the camera 100. The removable memory 284 serves as an additional image data storage area and may include a non-volatile device, readily removable and replaceable by a camera 100 user via the removable memory interface 283. Thus, a user who possesses several removable memories 284 may replace a full removable memory 284 with an empty removable memory 284 to effectively expand the picture-taking capacity of the camera 100. The removable memory 284 is typically implemented using a flash disk. Available vendors for flash memory include, for example, SanDisk Corporation of Sunnyvale, Calif. and Sony of Japan. Those skilled in the art will appreciate that the digital camera 100 may incorporate other memory configurations and designs that readily accommodate the image capture and processing methodology of the present invention.

The digital camera 100 also typically includes several interfaces for communication with a camera user or with other systems and devices. For example, the I/O controller 280 is an interface device allowing communications to and from the computer 140. The I/O controller 280 permits an external host, such as a cell phone, personal digital assistant (PDA), computer, or the like (not shown), to connect to and communicate with the computer 140. In typical use, the digital camera 100 would occasionally be connected to a local host device, such as a cellular phone or a Palm PDA device (available from Palm, Inc. of Santa Clara, Calif.) with wireless connectivity (e.g., Palm i705). Typically, a vendor-specific connection (cable) is employed to connect to the local host device. For example, for connecting to a Motorola cellular phone (e.g., Motorola StarTAC), one may employ a Motorola-compatible connection cable (or cableless direct connection) suitable for insertion into the Motorola accessory connector present on the Motorola cellular phone.

As shown, the I/O controller 280 also interfaces with a plurality of buttons and/or dials 298, and an optional status LCD 299, which in addition to the LCD screen 296 are the hardware elements of the user interface 295 of the device. The digital camera 100 may include the user interface 295 for providing feedback to, and receiving input from, a camera user, for example. Alternatively, these elements may be provided through a host device (e.g., personal digital assistant) for a media capture device implemented as a client to a host device. For an embodiment that does not need to interact with users, such as a surveillance camera, the foregoing user interface components may not be required. The LCD controller 290 accesses the memory (RAM) 266 and transfers processed image data to the LCD screen 296 for display. Although the user interface 295 includes an LCD screen 296, an optical viewfinder or direct view display may be used in addition to or in lieu of the LCD screen to provide feedback to a camera user. Components of the user interface 295 are available from a variety of vendors. Examples include Sharp, Toshiba, and Citizen Electronics of Japan, Samsung Electronics of South Korea, and Hewlett-Packard of Palo Alto, Calif.

The power management 262 communicates with the power supply 272 and coordinates power management operations for the camera 100. The power supply 272 supplies operating power to the various components of the camera 100. In a typical configuration, power supply 272 provides operating power to a main power bus 278 and also to a secondary power bus 279. The main power bus 278 provides power to the imaging device 120, the I/O controller 280, the non-volatile memory 282, and the removable memory 284. The secondary power bus 279 provides power to the power management 262, the processor 264, and the memory (RAM) 266. The power supply 272 is connected to batteries 275 and also to auxiliary batteries 276. A camera user may also connect the power supply 272 to an external power source, as desired. During normal operation of the power supply 272, the main batteries 275 provide operating power to the power supply 272 which then provides the operating power to the camera 100 via both the main power bus 278 and the secondary power bus 279. During a power failure mode in which the main batteries 275 have failed (e.g., when their output voltage has fallen below a minimum operational voltage level), the auxiliary batteries 276 provide operating power to the power supply 272. In a typical configuration, the power supply 272 provides power from the auxiliary batteries 276 only to the secondary power bus 279 of the camera 100.

The above-described system 100 is presented for purposes of illustrating the basic hardware underlying a media capturing and recording system (e.g., digital camera) that may be employed for implementing the present invention. The present invention, however, is not limited to just digital camera devices but, instead, may be advantageously applied to a variety of devices capable of supporting and/or benefiting from the methodologies of the present invention presented in detail below.

II. Methodology Providing Location-based Organization and Processing of Images

A. Introduction

In accordance with the present invention, location information is automatically captured for individual photographic images ("photos"). This information, in turn, is used to assist with organizing those images. The location information may also be used to assist with rapid photofinishing (fulfillment, including generation of hardcopies). Here, the user's current location is determined, for instance, from the device (e.g., camera/cell phone combination) at the time of the fulfillment request, or is determined from the most recently captured images. Additionally, the location information may be used to offer location-dependent promotions to the user. This may use the location information of individual photos (e.g., 20 percent off photofinishing for pictures taken at Disneyland), or may use the location information of where the user is currently located (e.g., 10 percent off photofinishing at Los Angeles-area Walgreens).

The method steps described below may be implemented using computer-executable instructions, for directing operation of a device under processor control. The computer-executable instructions may be stored on a computer-readable medium, such as CD, DVD, flash memory, hard (fixed) disk, or the like. The computer-executable instructions may also be stored as a set of downloadable computer-executable instructions, for example, for downloading and installation from an Internet location (e.g., Web server).

B. System Architecture

1. High-level Architecture

Figure 3:
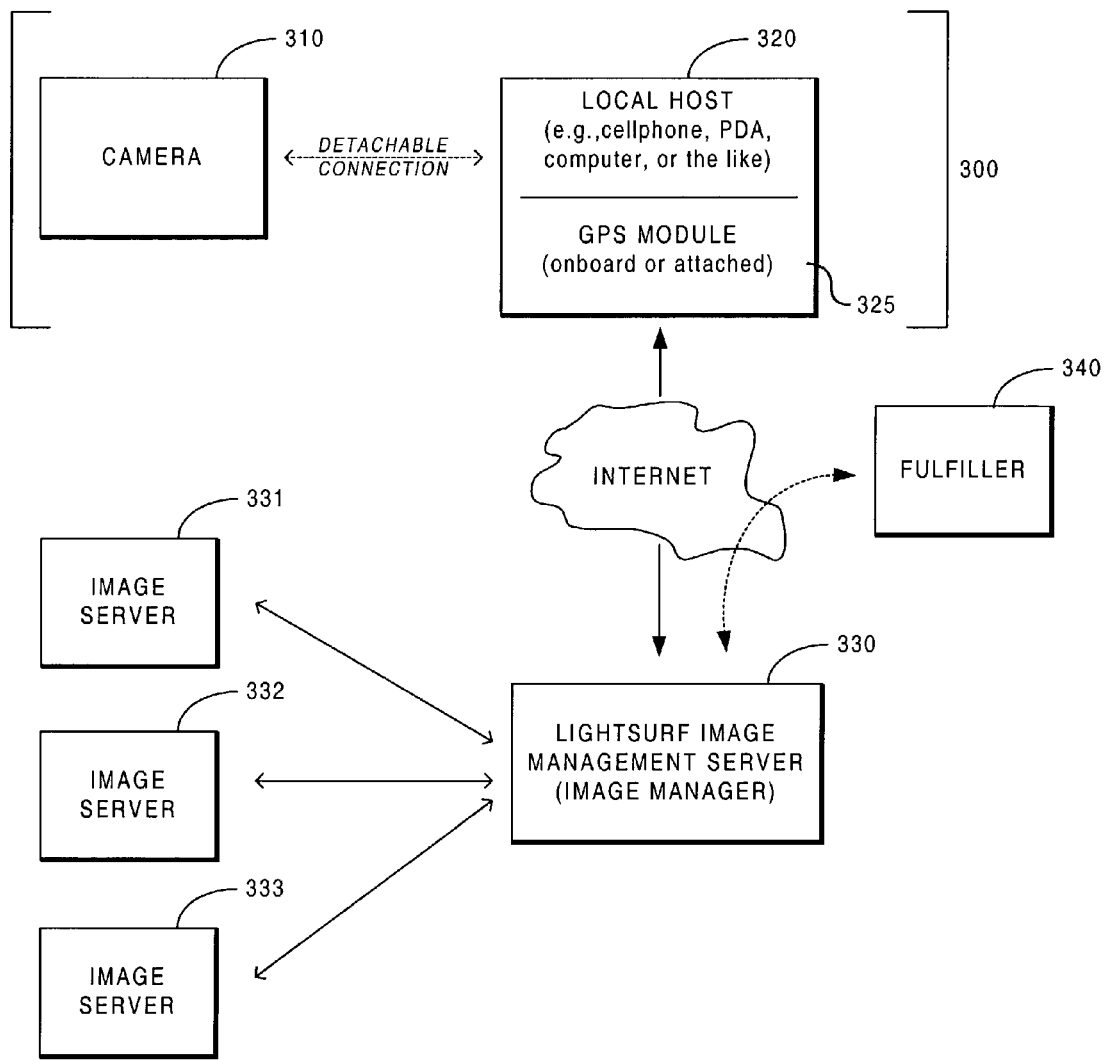
FIG. 3 is a high-level block diagram illustrating the basic components that comprise the environment in which the present embodiment may be implemented.

FIG. 3 is a high-level block diagram illustrating the basic components that comprise the environment in which the present embodiment may be implemented. As shown, system 300 includes a camera device 310, a host device 320, and a GPS (Global Positioning System) module 325. The camera device 310 is preferably a wireless camera device, such as camera device 100 (shown in FIG. 1A), that either includes wireless connectivity itself or connects to a local host with wireless connectivity. In the currently preferred embodiment, the camera device 310 is a stand-alone unit that is occasionally (or persistently) connected to the host device 320, which may be any device capable of hosting the camera device 310. For example, host device 320 may comprise a cellular phone, a PDA (personal data assistant) with wireless connectivity, or the like. The GPS module 325 is either a stand-alone or integrated module that provides real-time GPS information to the host 320, and in turn to clients of the host (i.e., camera 310) that may submit queries for GPS information. In the currently preferred embodiment, the GPS module 325 employs QUALCOMM's gpsOne positioning technology (available from QUALCOMM of San Diego, Calif.).

As shown, the host device 320 communicates with an online Web-based image management server 330. In the currently preferred embodiment, the image management server 330 is a Web-based server accessible via the Internet. It provides various services for supporting the host 320, as described in further detail below. In order to communicate with the image management server 330, the host device 320 establishes an Internet connection to the server, for example, using HTTP protocol. The image management server 330, in turn, may communicate with other modules, such as a fulfiller module 340 and image servers 331, 332, 333. The fulfiller module 340 includes program logic for receiving and processing fulfillment (photofinishing, such as generation of photo hardcopies and enlargements) requests from the image management server 330. The image servers 331, 332, 333, on the other hand, function as a repository to store the underlying binary files for the images under management by the image management server 330. These other modules may be located at remote locations (e.g., at third party computers) and/or may be co-located with the server 330 (i.e., local). In a typical configuration, the fulfiller module 340 is located remotely (e.g., at a third party fulfiller), and the image servers 331, 332, 333 are co-located with the image management server 330. The configuration is adaptable to other layouts, provided that at least occasional connectivity between the various components is maintained.

Briefly summarized, the interactions between the components are as follows. The user employs the camera 310 to take various pictures (i.e., capture images). Immediately or at some convenient point in time, location ID information (i.e., GPS information) from the GPS module 325 is associated with the images that are captured. The images are ultimately uploaded to a corresponding user account at the image management server 330. In the currently preferred embodiment, the uploading process occurs via wireless communication technique, with the local host (e.g., cell phone, wireless PDA, or the like) assuming responsibility for establishing a wireless data connection.

The association of location ID information (i.e., the GPS-derived longitude and latitude) with one or more images may occur immediately (e.g., upon capture) or may be deferred (e.g., upon uploading/offloading images from the camera), depending on the exact embodiment of the camera desired. For implementations in which the system 300 defers querying for the GPS information, the association is deferred until a convenient point in time. Such an implementation would be appropriate, for example, in cameras that exist stand-alone (i.e., disconnected) from the host device for significant periods of time. Here, association of location ID information conveniently occurs when the camera is connected to the host for the purpose of offloading images from the camera. At the point at which individual images are being uploaded, the appropriate location ID or GPS information may be associated with individual images or groups of images. As images are being uploaded to a destination image server (under control of the image management server), the location ID information may also be conveniently transmitted, either by attaching the information to the image data (e.g., as header information) and/or as a separate (auxiliary) data item. In the instance that the location ID information is transmitted separately, the information may be conveniently associated with one or more images by storing the location information in a database table (e.g., Oracle 9i database) that tracks image ID information. Here, the location ID information may be stored as a separate field that is correlated with one or more images (e.g., via image unique identifier).

For implementations in which the location ID information is associated with images while they reside within the camera, the location ID information may be associated with a given image (or set of images) in any manner suitable for the camera 310. For example, the location ID information for a given image(s) may be maintained in a separate data or attribute file. Alternatively, the location ID information may be stored together with the image data that comprises the image (e.g., stored in a header). Those skilled in the art will appreciate that there are a variety of techniques in which an attribute (e.g., location ID) may be associated with or stored with an underlying object (captured image).

If desired, the camera 310 and/or the host 320 may track historical location information. For example, the camera 310 and/or the host 320 may query the GPS module 325 at some convenient interval (e.g., hourly). In this manner, the system 300 may maintain a buffer or cache of time-correlated historical location information. Entries in the cache may be aged using FIFO (first-in, first-out) technique, LRU (least-recently used) technique, or other cache management technique. Since the image data already includes timestamp information (i.e., timestamp indicating when the image is captured), the system 300 may conveniently associate location ID information by matching timestamps of the various images against the system's time-correlated historical location information.

2. Low-level Architecture

Figure 4:
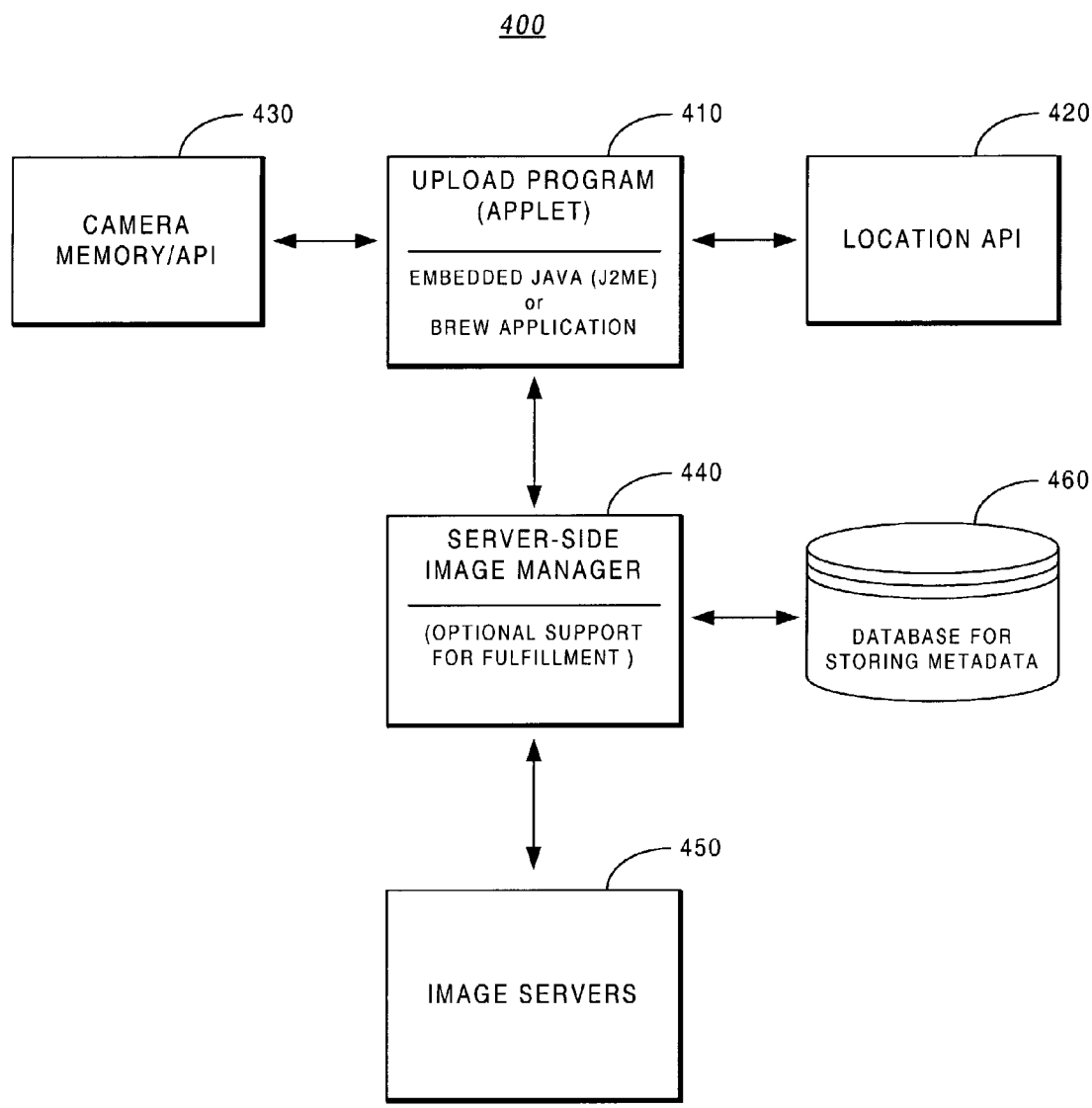
FIG. 4 is a block diagram that illustrates implementation of underlying functionality (i.e., processes) in the various modules of FIG. 3.

FIG. 4 is a block diagram that illustrates implementation of underlying functionality (i.e., processes) in the various modules of FIG. 3. As shown, system 400 includes the following functional modules: upload program 410, location API 420, camera memory/API 430, server-side image manager application 440, image servers 450, and database (e.g., Oracle) 460 for storing metadata information. The upload program 410 is implemented as an embedded application in the camera device, the host device, or a combination thereof. In a typical embodiment, the upload program 410 would be embedded as an application in a device run-time environment, such as J2ME (Sun Microsystems) or BREW (QUALCOMM). The upload program 410 is invoked, automatically or manually, when the user wishes to upload images to the user's account on an image server. The upload program 410 is also invoked, transparently, when the user wishes to have the images processed by a photofinisher (i.e., fulfiller). The upload program 410 communicates with the location API 420; this API is implemented by the chipset manufacturer (e.g., QUALCOMM) that provides an API to the GPS module (e.g., for embodiment having a GPS module embedded within the host/cell phone device). For example, for an embodiment using QUALCOMM hardware, the API 420 includes SnapCore™ Multi-mode GPS (MMGPS), available from SnapTrack, Inc. (a QUALCOMM subsidiary) of Campbell, Calif.

In response to a query from the upload program 410 (e.g., submitted as an HTTP request), the location API 420 returns GPS information indicating the then-current location (e.g., returned as an HTTP response). The GPS information may be converted into decimal values (if not in decimal form already) for indicating longitude and latitude. The upload program 410 also communicates with the camera memory/API 430, so that the upload program 410 can retrieve images from the camera. In this manner, the upload program 410 is able to invoke transfer of the images from the camera to the host (e.g., cell phone), for uploading to a destination image server.

The upload program 410 communicates with the server-side image manager 440, which represents server-side program logic typically implemented at a server (e.g., image management server 330) responsible for image organization (including naming and metadata management). The underlying images themselves will be stored via image servers module 450 (which corresponds to image servers 331, 332, 333) that are in communication with the server-side application 440. The upload program 410 assembles the image data for the images and the corresponding metadata comprising location information and user (identity) information, and then transmits all of that information/data to the image management server, via its communication with the server-side application 440. The file path to an individual image and the metadata/attributes of that image are stored in a corresponding data record in the database 460, which may be implemented using an Oracle database server or the like. Oracle database software is available from Oracle Corporation of Redwood Shores, Calif. At the completion of upload, image data has been stored at an image server and corresponding metadata information (which now contains the location ID information) has been stored at the database 460.

The server-side image manager application 440 can be configured to act on the image and metadata information in a variety of ways that are helpful for the user to associate an image with a geographic location. In particular, the server-side image manager application 440 can automatically categorize images based on location (i.e., location indicated in corresponding metadata). This allows the system to place images into an online or digital photo album (i.e., appropriately labeled folder) automatically, based on those images being captured or recorded in a given geographic location of interest (e.g., textural description for a particular geographic location, such as Grand Canyon, Disneyland, San Francisco, Fisherman's Wharf, New York, etc.). Such albums may then be accessed by the user (and shared with other users) using Web browser software (e.g., Microsoft Internet Explorer). In operation, the server-side image manager application 440 can compare or cross-reference the location ID information against a list or database of known locations. Entries in the database include a name (i.e., textual description, such as "Disneyland") of a given location of interest plus position information defining that location or region, such as central location (centroid, specified as longitude and latitude decimal values) plus radius. In the currently preferred embodiment, this process of resolving or matching location ID information to a specific geographic location of interest is done on-the-fly—that is, at the time the information is required. If desired, the user can override or edit this, to associate images with another location.

3. Support of Fulfillment

The approach of the present invention may be used to enhance photofinishing fulfillment. More particularly, the approach may be employed to allow the user to get printed photographs almost immediately. Here, the user employs the wireless camera to take a multitude of pictures. During this process or at a point in time convenient for the user, the pictures are transferred (e.g., after uploading) to a fulfiller (e.g., one-hour photofinisher) that is located in close proximity to where the user is currently taking pictures (e.g., based on current location of camera and/or device hosting the camera (e.g., GPS-enabled cellular phone), and/or based on location where images were captured). Therefore, soon after the user has concluded taking pictures and had those pictures transmitted to a nearby photofinisher (i.e., within a reasonable travel distance), the user can then simply go to the nearby photofinisher to pick up awaiting prints.

For an embodiment supporting automated fulfillment, the upload program 410 and the server-side image manager application 440 include logic supporting fulfillment selection/processing. Here, the upload program 410 includes logic to create a fulfillment request (i.e., user e-commerce order). In operation, the upload program 410 queries the user about the photofinishing order, including (1) the particular image size desired, such as 4×6, 5×7, or 8×11, (2) quantity desired, and (3) payment information. The upload program 410 transmits this user input and the current location (e.g., based on user location (i.e., current information from GPS module) and/or image capture location) to the server-side image manager application 440. Based on this information, the server-side image manager application 440 can determine an appropriate list of fulfillers. Program logic at the image server resolves the user's location (GPS information) against a database of fulfillers/retail partners (e.g., query against a database of fulfillers, the query being sorted by distance (nearness) to the user). A list of one or more fulfillers is transmitted back to the host device for display to the user. In turn, the upload program 410 instructs the host (and/or camera) to display the list of fulfillers, whereupon the user may select a particular convenient fulfiller.

Upon completion of the user's selection, the upload program 410 may transmit information back to the server-side image manager application 440 indicating the user's selection. In response, the server-side image manager 440 application transmits the images and fulfillment information to the selected fulfiller, whereupon those images may now be photofinished. In typical application, the images themselves are transmitted to the fulfiller directly from the image server where the images reside (i.e., after being uploaded from the user's camera by the host device). In that scenario, the camera itself may at that point be considered optional. If desired, however, the images may be transmitted directly to the fulfiller from the user's camera/host device (i.e., the camera is the immediate image source). To confirm correct receipt of the order, the server-side image manager application 440 may transmit back to the user a message confirming the order. This information is communicated to the user via the host (and/or camera). Later, the server-side image manager application 440 may transmit back another message for display to the user that indicates that photofinishing has completed.

4. Fulfillment Applet Logic and User Interface

FIGS. 5A-F illustrate execution of a client-side embedded applet (i.e., a small footprint application) that executes method steps and displays exemplary user interface (UI) dialogs/menus for supporting fulfillment. FIG. 5G provides a glossary that corresponds to the dialog (menu) selections shown in FIGS. 5A-F. Operation proceeds as follows. Step 501 indicates initial user activation of the client-side applet program, which may be embodied as an embedded J2ME applet in the local host. At step 502, the applet retrieves the network access identifier or NAI (e.g., user cell phone number) and password. At step 503, the applet determines whether the camera is currently connected to the local host. If the camera is not currently connected (i.e., "No" at step 503), the method precedes to step 505 to determine if the NAI and password exist. If "Yes," the method proceeds down execution path B, described below. If the NAI and password do not exist, then the method displays UI dialog 507. There, the user can verify that he or she has purchased a camera. If the user has not purchased a camera (i.e., "No" at UI 507), the applet proceeds to display an advertisement UI dialog 510. On the other hand, if the user has purchased the camera (i.e., "Yes" at UI 507), the applet displays UI dialog 508. The dialog 508 allows the user to register now (execution path P, described below) or register later (execution path C, described below).

Execution path P is simply used to allow the user to register. As shown by UI dialog 511, the user provides a password. The password must conform to system-specified constraints (e.g., maximum and minimum size), which are tested at step 513. Additionally, the first password entered must match the confirmation password that the user also entered. This is tested at step 514. In the event that the password does not conform to system-specified constraints (i.e., "No" at step 513), the applet proceeds down execution path Q (below). Similarly, if the password does not match the confirmation password (i.e., "No" at step 514), the applet proceeds down execution path R (below). Otherwise, if both of these steps are successfully passed, the applet proceeds down execution path S (below). If the camera is connected at step 503, then the applet also determines whether the NAI and password exist at step 504. If these do exist, the applet follows execution path B (below). Otherwise (i.e., "No" at step 504), the applet displays UI dialog 508 (as described above).

Figure 5A:
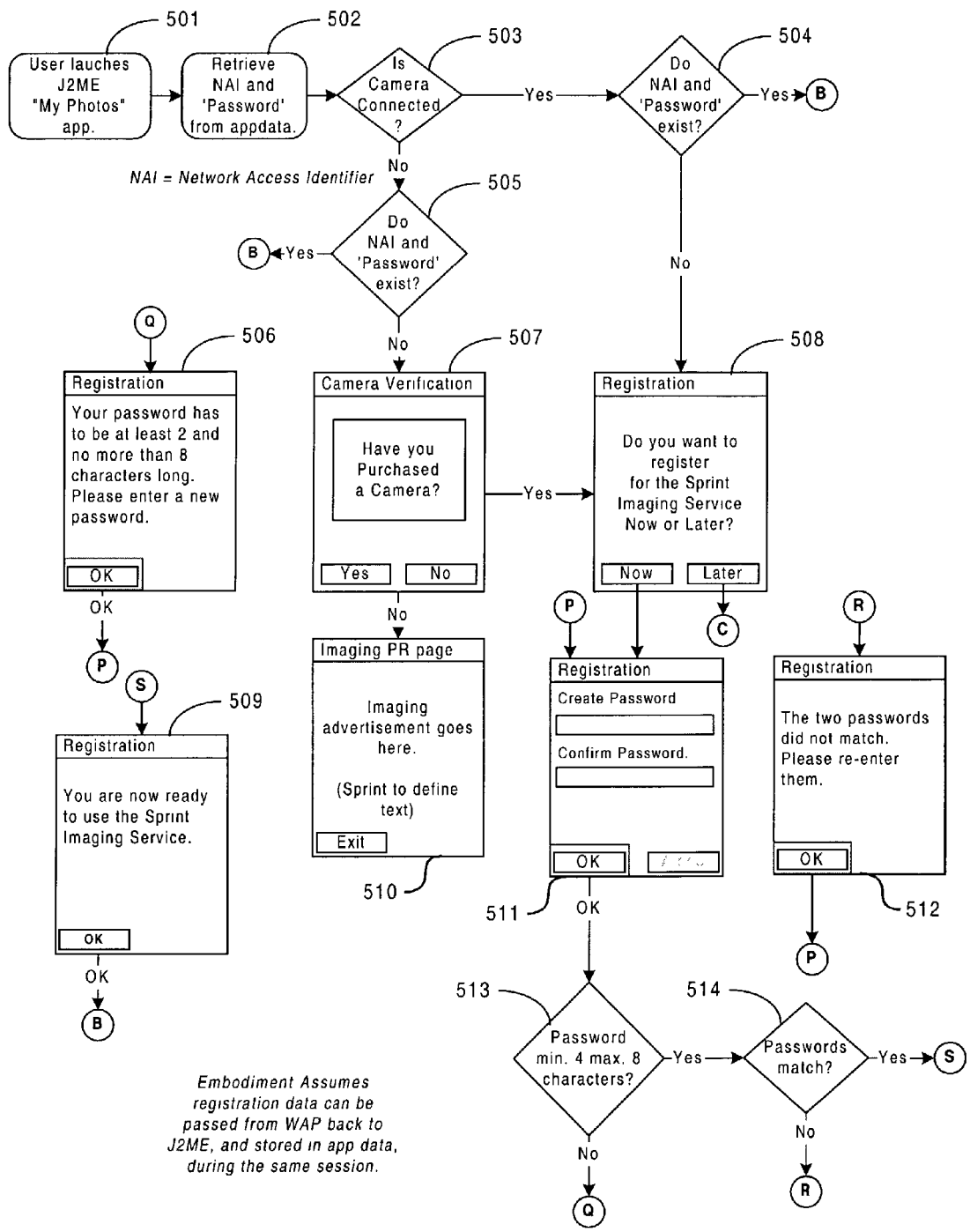
FIGS. 5A-F illustrate execution of a client-side embedded applet (i.e., a small footprint application) that executes method steps and displays exemplary user interface (UI) dialogs/menus for supporting fulfillment.
Figure 5B:
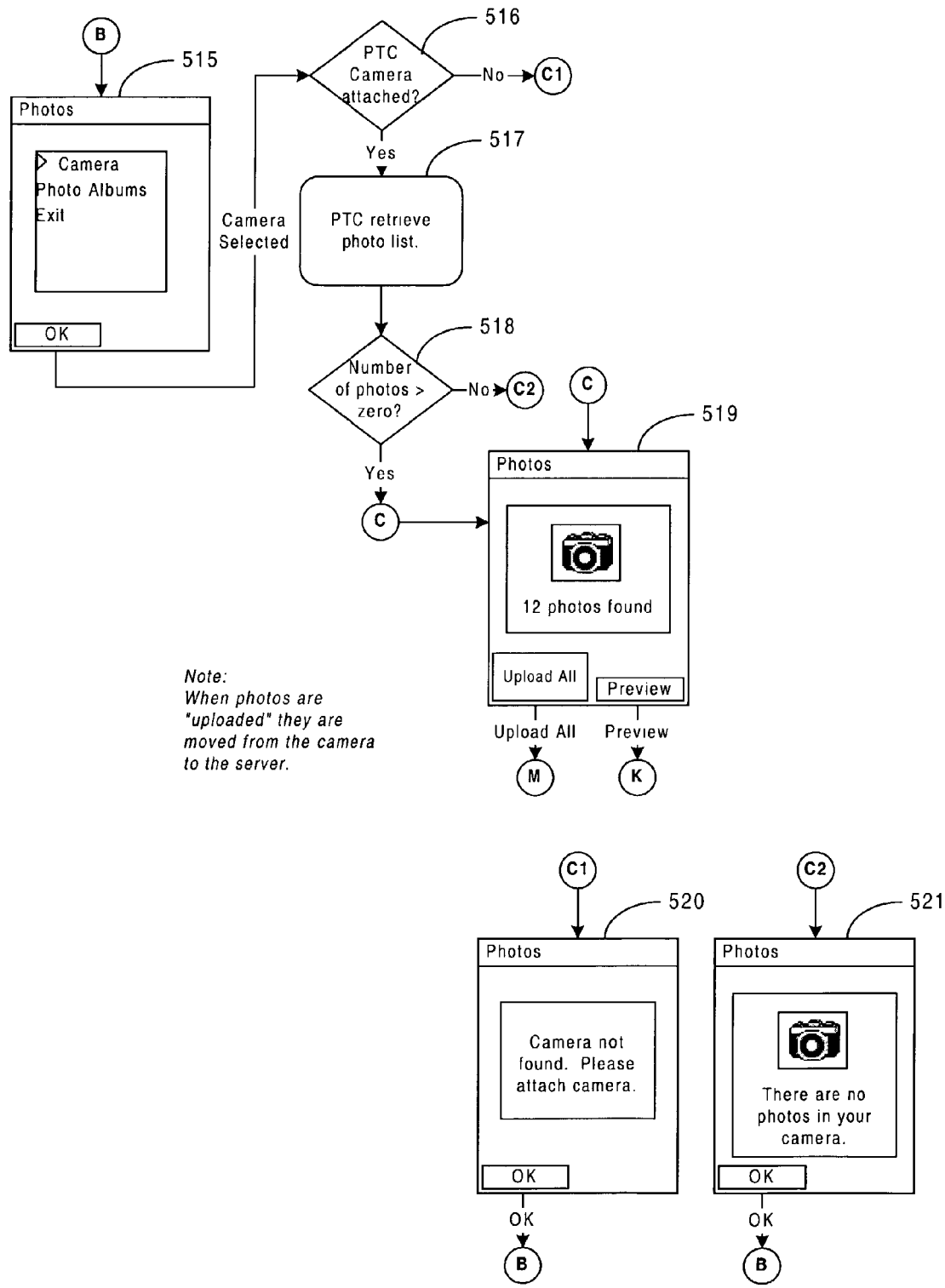

Execution paths Q, R, and S provide supplemental dialogs for registration. Paths Q and R represent exception conditions. As shown in FIG. 5A, at execution path Q, the applet displays a UI dialog 506 indicating that the entered password does not conform to minimum and maximum length constraints. At execution path R, the applet displays a UI dialog 512 indicating that the entered password does not match the confirmation password that the user also entered. After execution path Q or R, the applet returns the user to the UI dialog 511 (execution path P). At execution path S, the applet displays a UI dialog 509 indicating that the registration was successful, and that the user is now ready to begin using the service. Thereupon, the applet proceeds down execution path B (below).

Execution path B is employed for uploading photos from the camera. It proceeds as follows. First, the applet displays UI dialog 515, where the user is given access to photos on the camera or on photo albums (e.g., online photos), or the user may simply exit. Of interest for this example is the user selecting "Camera." Upon the user selecting "Camera" and "OK," the applet proceeds to step 516 to determine whether the camera is currently attached. If "Yes," a list of photos is retrieved at step 517. If the number of photos is greater than zero (tested at step 518), then the applet proceeds to execution path C (below). If at step 516, the camera is not attached, the applet proceeds to execution path C1 (described below). If at step 518, no photos are found (i.e., the list is empty), the applet proceeds to execution path C2 (described below).

Execution path C is utilized for displaying a photo uploading UI dialog 519. As shown, the UI dialog 519 indicates the number of photos found. The user may now select to "upload all" photos (execution path M, described below) or simply "preview" photos (execution path K, described below).

Execution paths C1 and C2 indicate exception processing. As shown for execution path C1, the applet displays a UI dialog 520 for indicating that the camera is not found. In execution path C2, the applet displays a UI dialog 521 for indicating that no photos have been found in the camera. From either dialog, the applet returns the user back to UI dialog 515 (i.e., return to execution path B, described above).

Figure 5C:
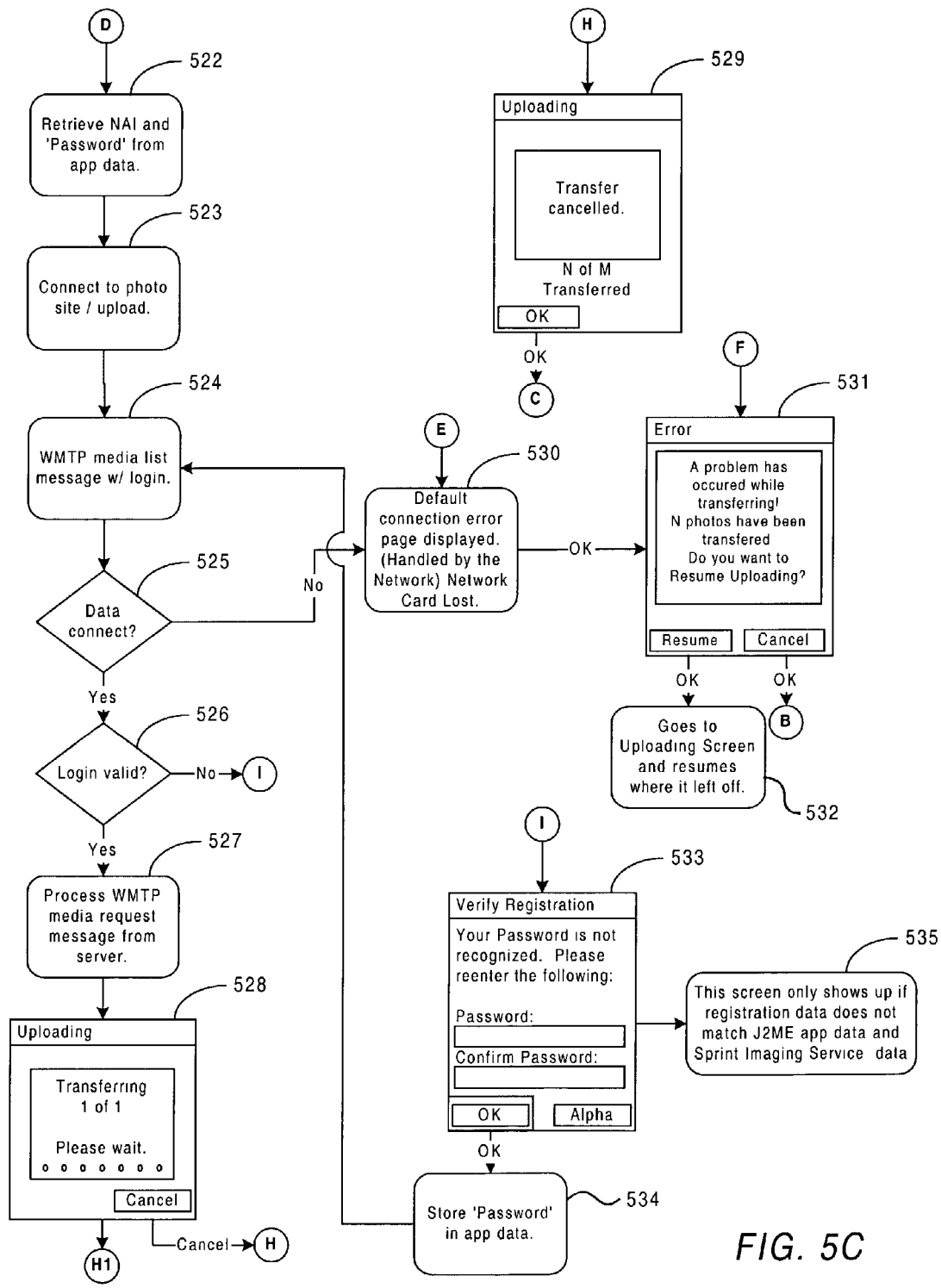

Execution path M is utilized to specify an upload destination. As shown in FIG. 5F, the applet displays a UI dialog 561. If the user simply cancels out of the dialog, the applet proceeds down execution path C (described above). On the other hand, if the user specifies a destination, the applet proceeds down one of three execution paths: path D for upload destination of "Inbox", path N for upload destination of "New Album", or path O for upload destination path of "Album List". These execution paths are described in further detail below.

Execution paths N and O are supplemental to execution path M (and M'). As shown in FIG. 5F, at execution path N, the applet displays a "create album" UI dialog 563. Here, the user specifies creation of a new album, including providing an album name. In execution path O, the user selects an album from a displayed list of albums in UI dialog 564. At the successful conclusion of either dialog 563 or 564 (i.e., the user selects "OK"), the applet proceeds to execution path D. If, however, the user cancels out of either dialog, execution simply returns to path M (above).

Execution path K is used for providing the user with an image preview, allowing individual image processing. At execution path K, the applet displays UI dialog 550 (FIG. 5E), which allows access to individual images on the camera. Here, the user is given a variety of options, as indicated by dialog 551: upload this photo, delete this photo, upload all photos, delete all photos, or exit. If the user selects the option to upload the current photo or upload all photos, the applet proceeds down execution path M'. If, however, the user selects the option to delete the current photo or delete all photos, the applet proceeds to execution path L. If the user simply selected to "exit" the dialog, the applet terminates execution, as indicated by step 552.

Execution path L simply functions to confirm deletion of photos (on the camera). As shown in FIG. 5E, the applet first displays UI dialog 553, where the user provides confirmation (i.e., selects "Yes") to confirm deletion of photo(s). At step 554, the applet performs deletion of the photo(s). At step 555, if no more photos remain (i.e., the number of photos is not greater than zero), the applet proceeds to execution path C2 (above). If additional photos do remain or the user has canceled out of the dialog 553, the applet returns to execution path K (described above).

Execution path M' is analogous to execution path M. As shown in FIG. 5F, the applet displays a "select album" at UI dialog 562 that is essentially the same as the "upload destination" UI dialog 561, except that the dialog title is changed. In the dialog 562, the applet again displays choices of "Inbox" (execution path D), "New Album" (execution path N), and "Album List" (execution path O). Cancellation of the dialog 562 by the user, however, leads the applet down execution path K (instead of execution path C, which is employed during cancellation of UI dialog 561).

Execution path D handles uploading of photos. As shown in FIG. 5C, execution occurs as follows. At step 522, the applet retrieves the NAI and password. At step 523, the applet establishes a connection to the photo site (Web-based server providing image management) for uploading of photos. At step 524, a media list message and login is transmitted. At step 525, a determination is made whether a data connection has been established. If "Yes" (i.e., successful connection), execution proceeds to step 526, to determine whether the login is valid. If it is valid, then the applet proceeds to step 527 to process a media request message from the server. Then, uploading proceeds pursuant to the uploading dialog 528. The user may cancel the uploading (execution path H). Execution path H causes display of a "transfer canceled" message, as shown by dialog 529; thereafter, execution proceeds to C (described above). If uploading is not interrupted at dialog 528, the uploading process completes and then execution proceeds along path H1.

If a data connection is not established at step 525, then at step 530 a default connection error page is displayed, as shown in FIG. 5C. Then, the applet displays UI menu 531 to report the error. Thereafter, the user can select "Resume" whereupon the applet proceeds to the uploading screen and resumes where it left off (as indicated by step 532). Otherwise, the user may select "Cancel" whereupon execution proceeds along path B (described above).

If a valid login is not obtained at step 526 above, then the applet proceeds along execution path I. The execution path I (also shown in FIG. 5C) leads to display of a "verify registration" UI dialog 533. As indicated by step 535, the screen is only displayed if the registration data does not match the J2ME applet data and wireless carrier (e.g., Sprint Imaging Service) data. At the dialog 533, the user may ensure correct information and then select "OK", whereupon the password is stored as part of the applet data, as indicated at step 534. Thereafter, execution may then proceed back to step 524 (described above).

Figure 5D:
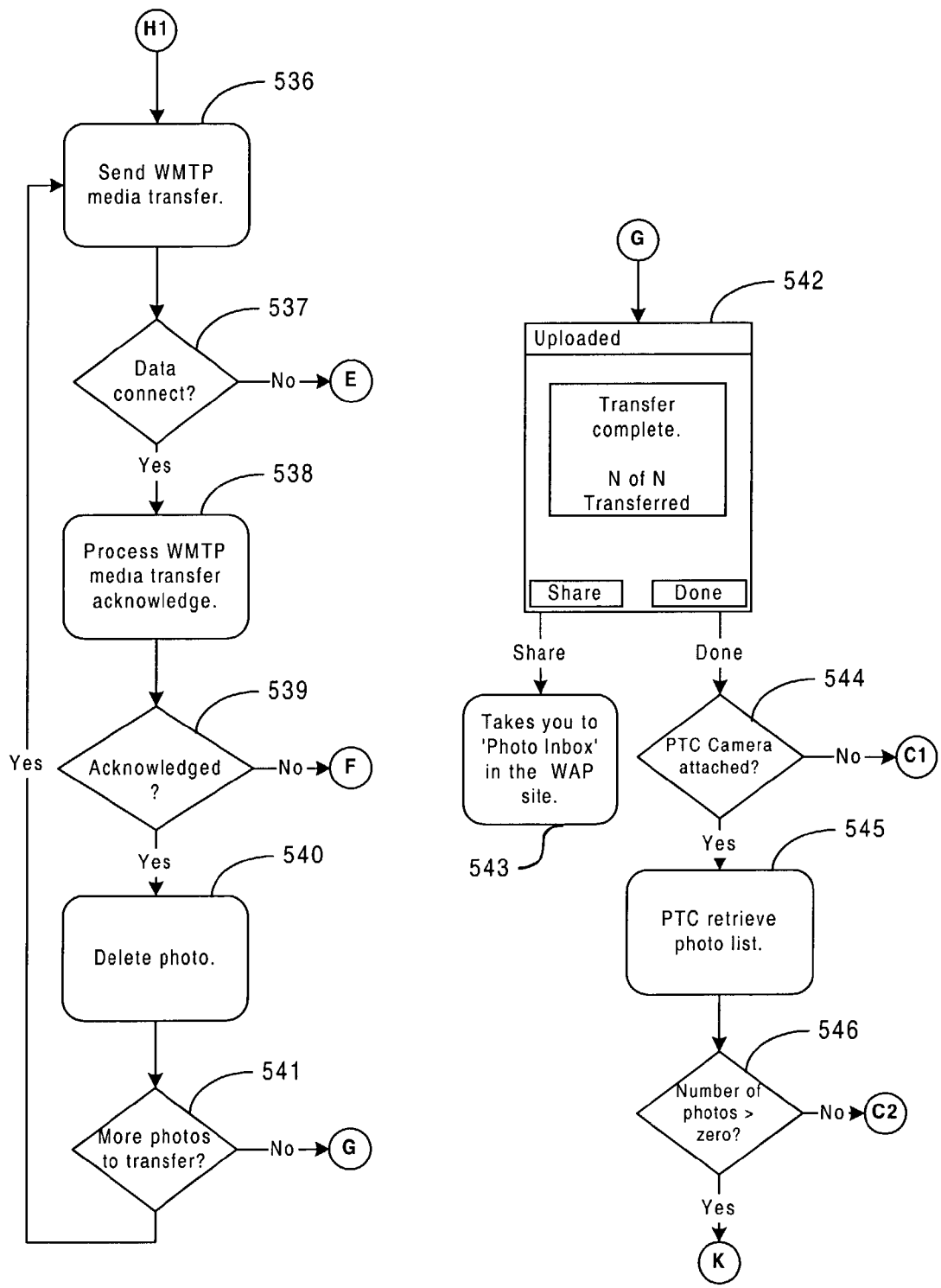
Figure 5E:
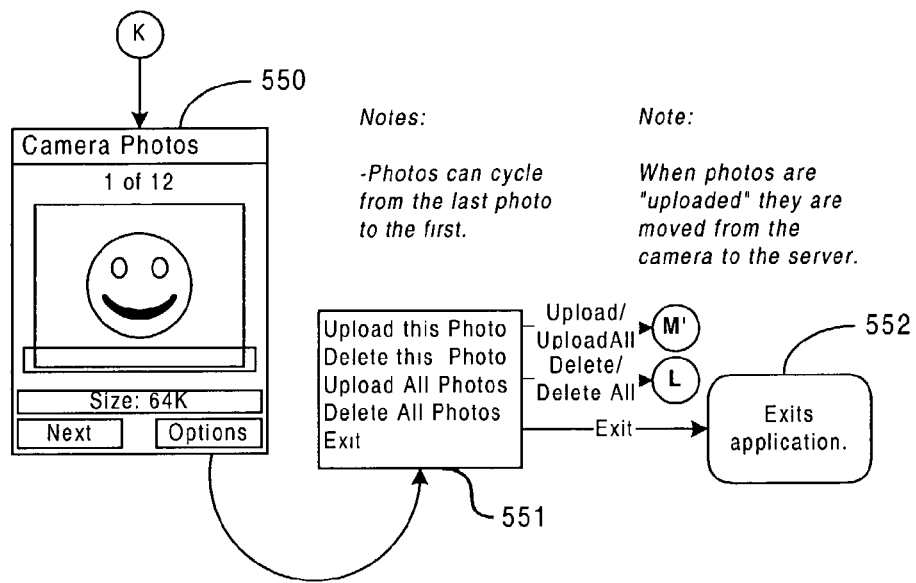
Figure 5E:
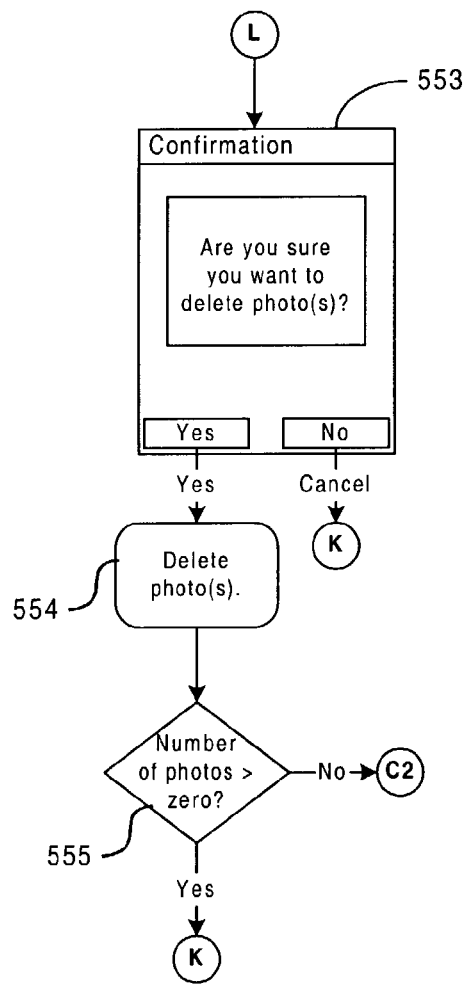
Figure 5F:
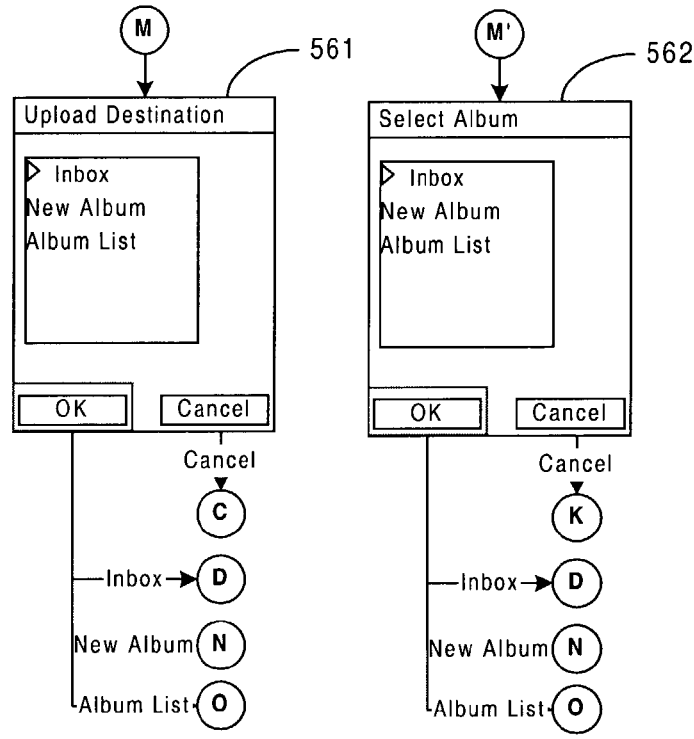
Figure 5F:
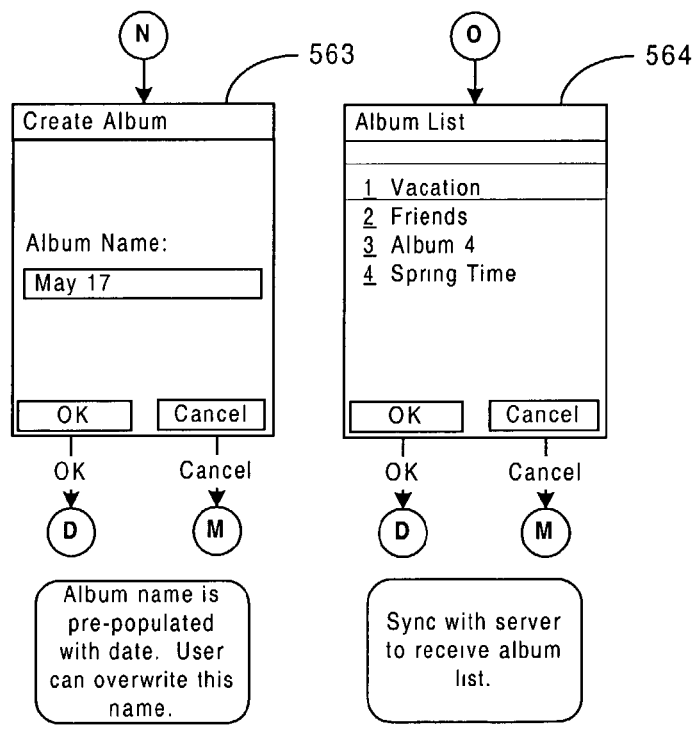

Execution path HI is illustrated in FIG. 5D. As shown, at step 536, the applet sends a media transfer (message). At step 537, the applet determines whether a valid data connection exists. If not, then execution proceeds to path E (which simply enters step 530). Otherwise, execution proceeds to step 538, where the applet processes a media transfer acknowledgment (message). If a valid acknowledgment does not occur, tested at step 539, then execution proceeds to path F (which simply enters dialog 531). Otherwise, execution proceeds to step 540, where the photo is deleted (from local storage). At step 541, the applet determines whether more photos exist to transfer. If "Yes," the execution proceeds back to step 536 (to repeat the process). Otherwise, execution proceeds to path G.

Also shown in FIG. 5D, the execution path G proceeds as follows. First, an "uploaded" UI dialog 542 is displayed. Here, the user can select to "Share" the photos, or simply select "Done". In the case where the user has elected to share the photos, execution proceeds to step 543 to take the user to a "Photo Inbox" at the Web site (accessible at the local host via WAP protocol). Otherwise, in the case that the user has elected "Done", execution proceeds to step 544. At step 544, the applet determines whether the camera is attached. If not, execution proceeds to path C1. If "Yes," the list of photos is retrieved at step 545. Then, at step 546, the applet determines whether the number of photos is greater than zero. If the number is greater than zero, execution proceeds to path K (described above). Otherwise, execution proceeds to path C2.

Determination of applicable promotions operates in a manner similar to that of selecting a fulfiller. Here, however, the user's location is matched against a list or database of promotions that are relevant to that user location. The resulting set of promotions is transmitted back to the host device, for viewing/selection by the user, for example as a WAP page, an SMS message, an e-mail alert, or the like.

C. Automated Organization of Photos into Location-based Photo Albums

Figure 6:
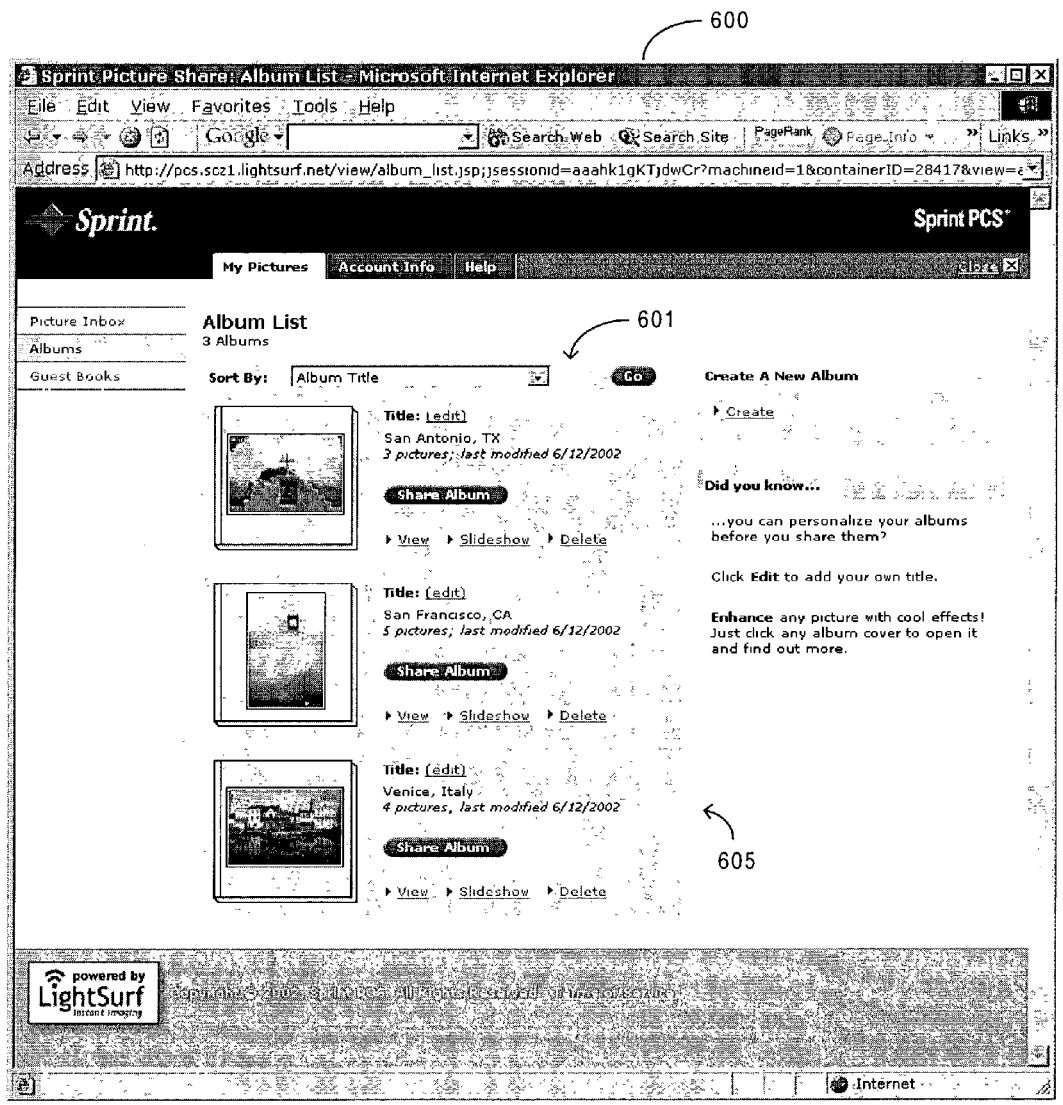
FIG. 6 illustrates an exemplary user interface, which includes automatic organization of photos based on location.

Of particular interest to users is the use of location information to automatically organize a user's photos. As the user's images are uploaded to his or her account, the images are organized automatically, for example, based on a given location category. FIG. 6 illustrates an exemplary user interface, which includes automatic organization of photos based on location. As shown, user interface 600 provides a browser-based interface for accessing one's photos on-line. The photos are arranged into separate on-line "albums" 601, with each album containing the photos that are related to one another (within the album) by location (e.g., taken from within a given geographic region). As illustrated at 605, for example, each album includes a descriptor, such as "Venice, Italy", indicating the geographical origin of the photos within the album. If desired, the user may edit the default text to provide or override the automatically provided location descriptor. Additionally as shown by the user interface 600, each album includes user interface elements (e.g., screen buttons) for inputting user commands that operate on the photos within that album, including commands of "view", "share", "delete", or "slide show" (i.e., create slide show).

D. Internal Operation

1. Determination of Location

For purposes of implementing the preferred embodiment, it is assumed that the host (e.g., handheld cellular phone device or the like) can figure out where it is presently located. In one embodiment, the actual mechanism employed for positioning may be treated as a "blackbox." Also, it is assumed that the host device has some type of programming or run-time environment that supports the running of software. Additionally, the host device supports some type of query capability, so that run-time software may query the host device for determining the device's current location.

In the currently preferred embodiment, specific geographic locations (e.g., Disneyland) are represented by storing a "centroid" (i.e., longitude and latitude of a central location) and radius, together with a descriptive name for the location. The radius can range from large (e.g., several miles for San Francisco), to intermediate (e.g., a few miles for Fishermen's Wharf in San Francisco), to very small (e.g., 20 feet for a particular photo store). Typically, the user's GPS location will not exactly match a given geographic location. By using the combination of a centroid and radius, however, the system can readily determine whether the user's GPS location lies within a given geographic location of interest to the user. Here, the system performs a simple calculation to determine the distance between the user's GPS location and the centroid for a given geographic location. For example, this calculation may be performed within an SQL stored procedure as follows.

```
FUNCTION find_closest_stores
    (
    in_retailer_code    IN   retailer_ref_t.retailer_code%TYPE,
    in_country_code     IN
postal_code_location_ref_t.country_code%TYPE,
    in_postal_code      IN   postal_code_location_ref_t.postal_code%TYPE,
    in_count            IN   NUMBER
    )
RETURN store_list_rc_type
IS
        my_longitude postal_code_location_ref_t.longitude%TYPE;
        my_latitude postal_code_location_ref_t.latitude%TYPE;
        my_rc    store_list_rctype;
        my_postal_code_available  BOOLEAN := TRUE;
BEGIN
    BEGIN
        SELECT longitude, latitude
        INTO my_longitude, my_latitude
        FROM postal_code_location_ref_t
        WHERE country_code = in_country_code
        AND   postal_code = in_postal_code
        AND   latitude IS NOT NULL
        AND   longitude IS NOT NULL;
    EXCEPTION
        WHEN NO_DATA_FOUND THEN my_postal_code_available := FALSE;
    END;
    IF my_postal_code_available THEN
        OPEN my_rc FOR
        SELECT *
        FROM (
            SELECT
store_t.*,SQRT(POWER(69.1*ABS(latitude-
my_latitude),2)+POWER (53*ABS (longitud
e-my_longitude),2)) distance
            FROM store_t
            WHERE retailer_code = in_retailer_code AND enabled_flag = '1'
            ORDER BY distance
            )
            WHERE rownum <= in_count;
    ELSE
        OPEN my_rc FOR SELECT STORE_T.*, 1 DISTANCE FROM STORE_T WHERE 1 = 0
AND
retailer_code = in_retailer_code AND enabled_flag = '1';
    END IF;
    RETURN my_rc;
END find_closest_stores;
```

If the calculated distance is less than or equal to the radius, then the user's GPS location is within the given geographic location. Additionally, the calculated distance can be used to determine how far away the user is from a particular geographic location, for example, for determining whether the user is "near" a given location (although the user may not be located "within" the given location). This approach is used to determine which photofinishers are close to the user.

2. Basic Internal Operations for Uploading and Organizing

Figure 7:
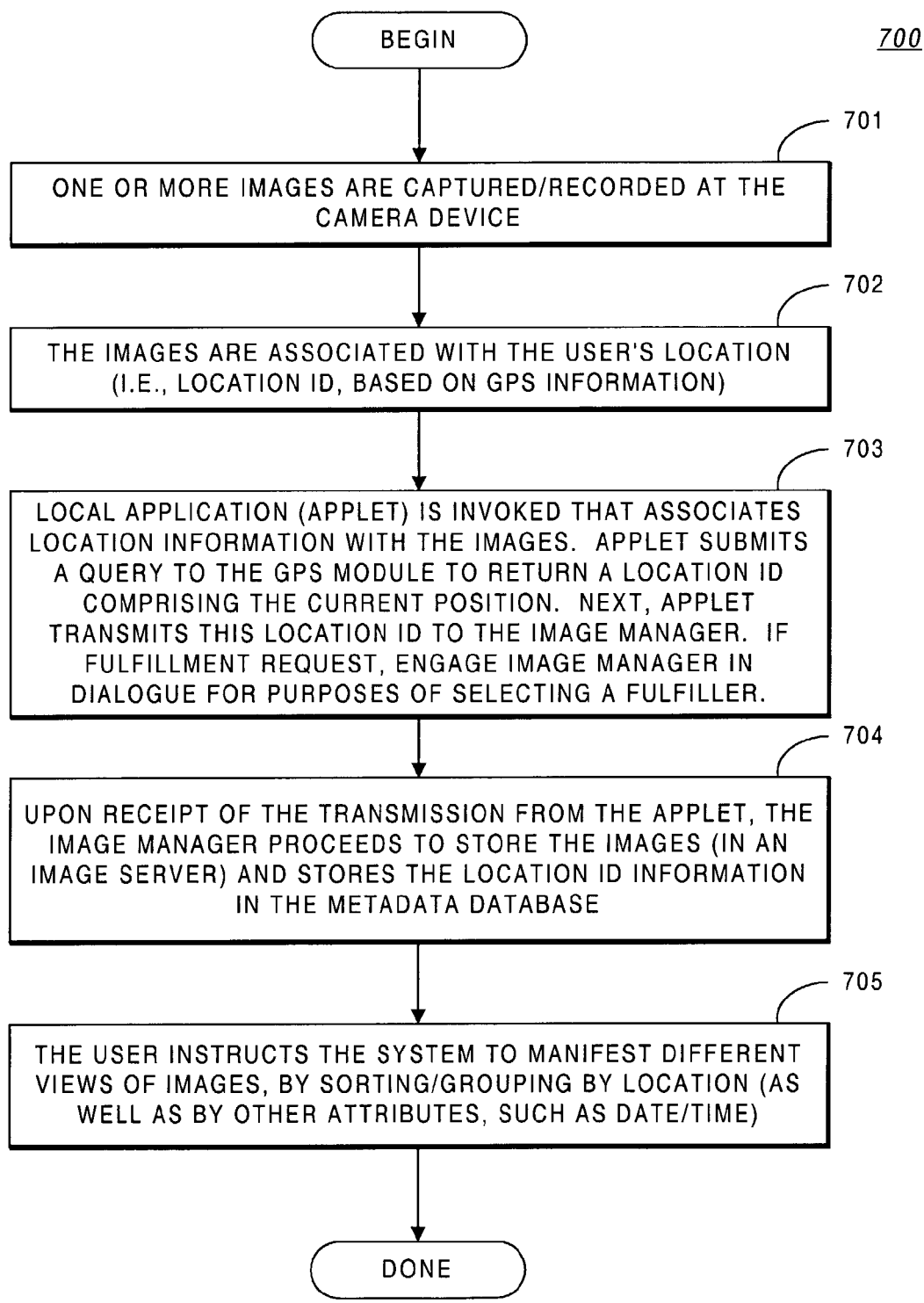
FIG. 7 is a high-level flowchart summarizing a method of operation of the present invention for the automated uploading and organizing of photographic images, based on location information.

FIG. 7 is a high-level flowchart summarizing a method 700 of operation of the present invention for the automated uploading and organizing of photographic images, based on location information. In the currently preferred embodiment, the current GPS location is not captured each time a photographic image is captured. In typical use, the user employs the digital camera detached from the local host, and therefore detached from the GPS module. Of course those skilled in the art will appreciate that the digital camera may be designed to incorporate its own GPS module, so that GPS information could be recorded at the same instance that a photographic image is captured. However, in current embodiments, it is typically more cost-effective to embed the GPS module in the local host (e.g., cell phone or PDA device) than in the camera device. Therefore, the following description will focus on the currently preferred methodology, where the GPS module resides outside the camera device (e.g., exists stand-alone or embedded within the local host).

The method steps are as follows. As indicated at step 701, one or more images are captured/recorded at the camera device. Next, at step 702, the images are associated with the user's location (i.e., location ID, based on GPS information). Typically, this occurs when the camera is attached to the local host. Upon attachment of the camera to the local host, the images are either automatically uploaded or the user manually requests uploading. At step 703, upon receipt of the request that the images be uploaded, a local application (applet) is invoked that associates location information with the images. This includes the following substeps. First, the applet submits a query to the GPS module to return a location ID comprising the current position (latitude and longitude). Next, the applet transmits this location ID to the image manager, as part of the transmission that uploads the images. If the uploading is in connection with a fulfillment request, the applet also engages the image manager in dialog for purposes of selecting a fulfiller. The specific method steps involved in this interaction are described below, in FIG. 8.

Upon receipt of the transmission from the applet, the image manager proceeds to store the images (in an image server) and stores the location ID information in the metadata database, as indicated by step 704. In the currently preferred embodiment, the images are stored as individual files (e.g., using UNIX file system). The metadata, including the location ID, is stored as a database record in a database table in the metadata database. The database table is keyed by a unique element (image) ID, and also includes fields for user ID, timestamp (date/time), and location ID (longitude and latitude decimal values). The location information that is associated with the images is not necessarily permanent. Since the system includes connectivity to a database of interesting geographic locations, the user may "re-ID" the images with another location, as desired. This allows the user to "tweak" the associated location, if needed. Finally, as indicated by step 705, the user can instruct the system to manifest different views of images, by sorting/grouping by location (as well as by other attributes, such as date/time). In the currently preferred embodiment, the images are automatically filed into different folders or "albums" based on location, which may (optionally) be assigned a descriptive title that includes information indicating geographic location (e.g., "Venice, Italy"). In this manner, when the user goes to view his or her images on-line, he or she will find them already sorted by location into different folders.

3. Basic Internal Operations for Fulfillment

Figure 8A:
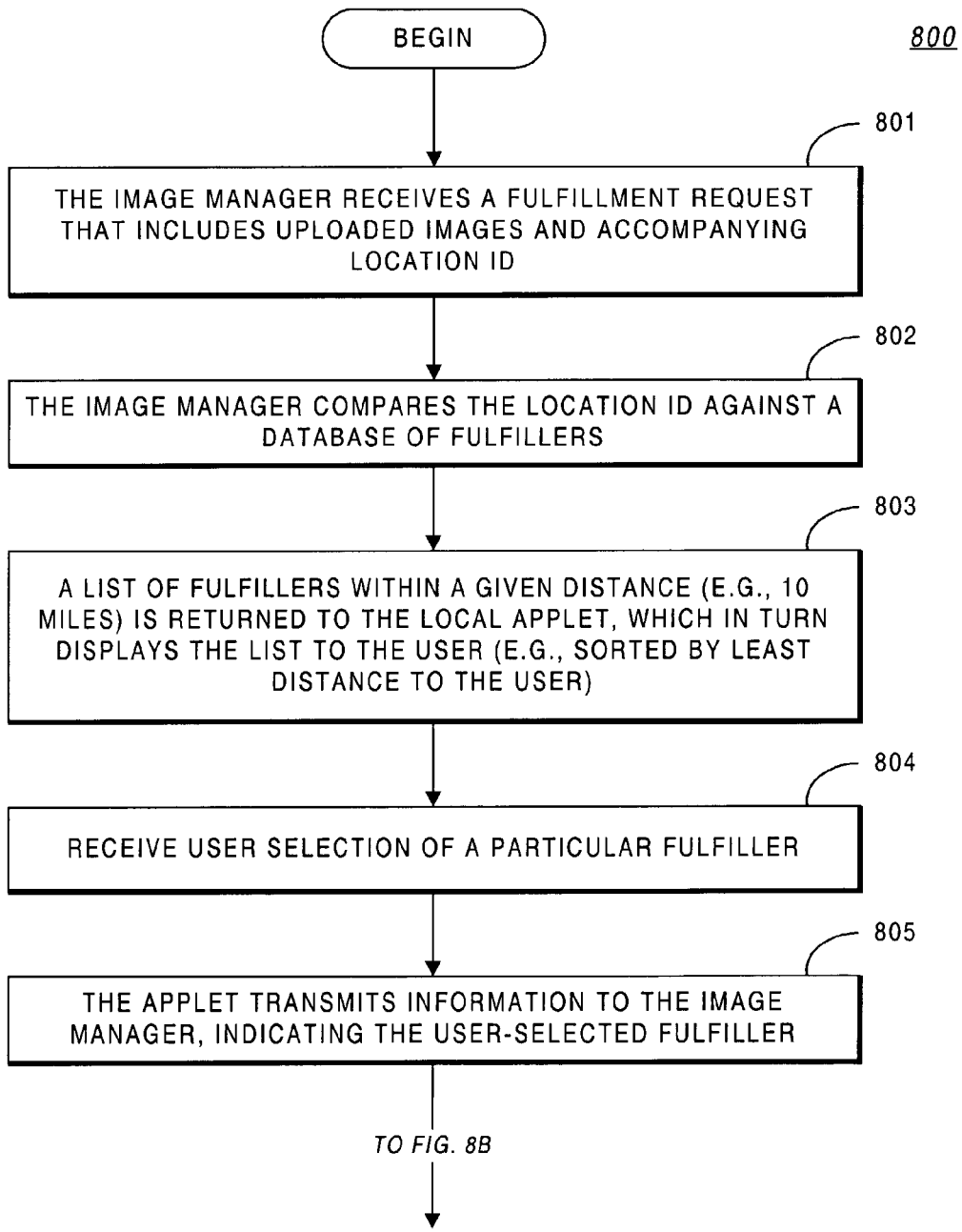
FIG. 8 is a high-level flowchart illustrating a method of the present invention for processing a fulfillment request.
Figure 8B:
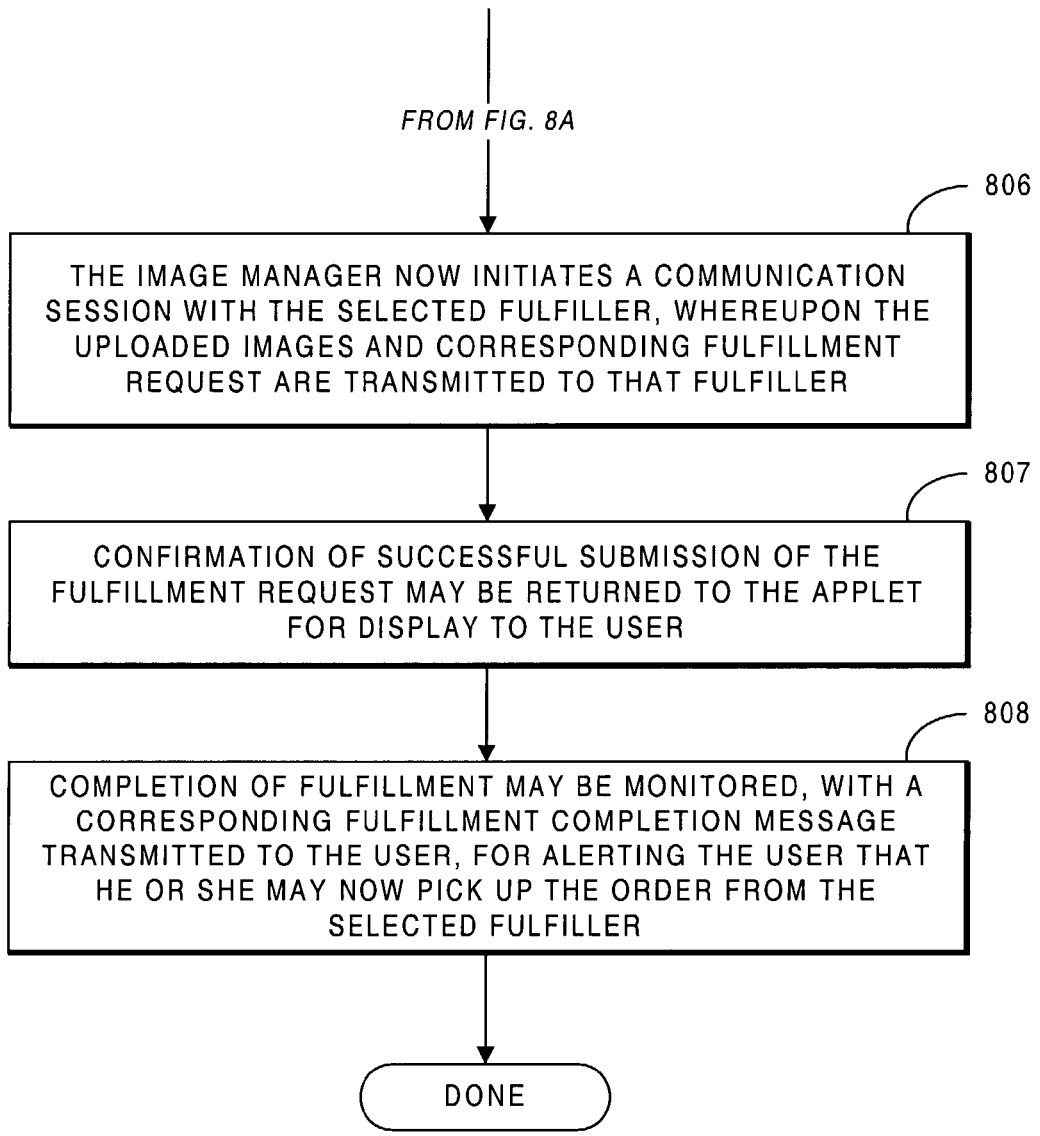

FIG. 8 indicates the additional steps involved in a method 800 of the present invention for processing a fulfillment request. As shown at step 801, the image manager receives a fulfillment request that includes uploaded images and accompanying location ID. In response to receiving this information, the image manager compares the location ID against a database of fulfillers, at step 802. A list of fulfillers within a given distance (e.g., 10 miles) is returned to the local applet, which in turn displays the list to the user (e.g., sorted by least distance to the user), as indicated by step 803. Upon receiving user selection of a particular fulfiller, at step 804, the applet transmits information to the image manager, at step 805, indicating the user-selected fulfiller. As shown in FIG. 8B, at step 806, the image manager initiates a communication session with the selected fulfiller, whereupon the uploaded images and corresponding fulfillment request are transmitted to that fulfiller. Confirmation of successful submission of the fulfillment request may be returned to the applet for display to the user, as indicated at step 807. Finally, as indicated at step 808, completion of fulfillment may be monitored, with a corresponding "fulfillment completion" message transmitted to the user, for alerting the user that he or she may now pick up the order from the selected fulfiller.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A method for assisting a user with fulfillment of image photofinishing, the method comprising:
   receiving a plurality of images captured at an imaging device at a server-side image manager;
   storing the plurality of images in one or more image servers coupled with the server-side image manager, wherein the plurality of images are associated with a corresponding user account in a metadata database maintained by the server-side image manager;
   receiving a request for photofinishing that identifies one or more images of the stored plurality of images;
   automatically determining at least one fulfiller that is at a location appropriate for the user based on data received simultaneously with the one or more images;
   displaying a promotion, for the photofinishing service, that is based at least in part on both a current location and a given geographic region distinct from the current location where the one or more images were captured, and provides the promotion for photofinishing images; and
   transmitting the identified one or more images from the one or more image servers, by the server-side image manager, to the selected fulfiller for photofinishing.

2. The method of claim 1, wherein said request is generated in response to an action by the user.

3. The method of claim 1, wherein said request is automatically generated.

4. The method of claim 1, wherein photofinishing includes generating hardcopies of the images.

5. The method of claim 1, wherein said step of automatically determining at least one fulfiller includes:
   determining at least one fulfiller that the user is near.

6. The method of claim 1, wherein said step of automatically determining at least one fulfiller includes:
   determining a current location for the user.

7. The method of claim 6, wherein said step of determining a current location for the user includes:
   determining GPS (Global Positioning System) information for the current location of the user.

8. The method of claim 7, wherein said step of determining GPS (Global Positioning System) information includes:
   connecting the imaging device to a local host device capable of transmitting the images to another system; and
   querying a GPS module that is in communication with the local host device for determining the current location of the user.

9. The method of claim 1, further comprising:
   displaying a list of said at least one fulfiller to the user.

10. The method of claim 9, wherein said selecting step includes:
    receiving user selection of a particular fulfiller from the list.

11. The method of claim 1, wherein said transmitting step includes transmitting the images wirelessly.

12. The method of claim 1, wherein said transmitting step includes:
    transmitting the images from the imaging device to a corresponding user account on a Web server; and
    transmitting the images from the Web server to the fulfiller.

13. The method of claim 1, wherein said step of automatically determining at least one fulfiller includes:
    determining a longitude and latitude for the user.

14. The method of claim 13, wherein said determining step includes:
    querying a GPS (Global Positioning System) module for the longitude and latitude.

15. The method of claim 1, further comprising:
    uploading the captured images to a host device; and
    during uploading, transmitting location information to the host device for the captured images, for indicating a location where each image was captured.

16. The method of claim 1, wherein said step of automatically determining at least one fulfiller that is at a location appropriate for the user includes:
    determining current GPS (Global Positioning System) information; and
    cross-referencing the determined GPS information against a database of fulfillers.

17. The method of claim 16, wherein the database stores a plurality of entries for different fulfiller locations, each entry including a central location and a radius.

18. The method of claim 1, wherein said step of transmitting the plurality of images to the selected fulfiller for photofinishing includes:
   connecting the imaging device to a local host; and
   using the local host to wirelessly transmit the plurality of images from the imaging device.

19. A computer-readable medium storing computer-executable instructions, which when executed by a computer system, cause the computer system to perform the method of claim 1.

20. A computer readable medium storing a downloadable set of computer-executable instructions, which when executed by a computer system, cause the computer system to perform the method of claim 1.

21. An imaging system with support for automated image photofinishing fulfillment, the system comprising:
   an imaging device capable of capturing a plurality of images;
   a local host, at least occasionally connected to the imaging device, that is capable of offloading images from the imaging device and capable of determining a current position;
   a remote host capable of receiving the plurality of images and associated position information together at the same time, capable of storing the plurality of images in one or more image servers coupled with the remote host, wherein the plurality of images are associated with a corresponding user account in a metadata database maintained by the remote host, capable of receiving a request for photofinishing the images stored in the one or more image servers, and capable of transmitting the plurality of images from the one or more image servers to a particular fulfiller for photofinishing, based on the current position; and
   wherein said local host includes a display for displaying a promotion, for a photofinishing service, that is based at least in part on both said current position and a given geographic region distinct from the current position where the plurality of images were captured, and provides the promotion for photofinishing image.

22. The system of claim 21, wherein said imaging device comprises a digital camera.

23. The system of claim 21, wherein said local host comprises a cellular phone.

24. The system of claim 21, wherein said local host comprises a computing device.

25. The system of claim 21, wherein said local host comprises a personal digital assistant (PDA) device.

26. The system of claim 21, wherein said local host is capable of wirelessly transmitting the captured images to the remote host.

27. The system of claim 21, wherein said local host is capable of querying a GPS (Global Positioning System) module for determining position information.

28. The system of claim 27, wherein said GPS module is housed within said local host.

29. The system of claim 27, wherein said GPS module is connected externally to said local host.

30. The system of claim 21, wherein said particular fulfiller is selected based on determining fulfillers that are near said current position.

31. The system of claim 21, wherein said request for photofinishing occurs in response to user input.

32. The system of claim 21, wherein said request for photofinishing occurs automatically.

33. The system of claim 21, wherein said local host includes a display for listing fulfillers that are located nearby.

34. The system of claim 33, wherein said local host includes an input for receiving user selection of a particular fulfiller from the fulfillers that are displayed.

35. The system of claim 21, wherein said images are transmitted from the remote host to the particular fulfiller.

36. The system of claim 35, wherein said images are transmitted via the Internet from the remote host to the particular fulfiller.

37. The system of claim 21, wherein said local host includes a display for indicating when photofinishing of the images is complete.

38. The system of claim 21, wherein said promotion for the photofinishing service provides a coupon or a discount.

39. A wireless digital camera device with fulfillment support, the device comprising:
   an imaging module capable of capturing a plurality of images;
   a module capable of wirelessly transferring the images from the device to a server side image manager for storage by an image server, coupled with the server side image manager, and associated with a corresponding user account maintained by the server-side image manager, the transferring including location information transferred simultaneously with the images;
   an application logic module enabling selection of a particular fulfiller from a list of fulfillers, the list of fulfillers selected based at least in part on the location information, wherein the application logic module further enables a display of a promotion, for a photofinishing service, that is based at least in part on both a current location and a given geograrphic region distinct from the current location where one or more of the images were captured, and provides the promotion for photofinishing the images.

40. The device of claim 39, wherein said module capable of wirelessly transferring the images is detachable from the device.

41. The device of claim 40, wherein said module capable of wirelessly transferring the images includes cellular phone capability.

42. The device of claim 40, wherein said module capable of wirelessly transferring the images includes computing capability.

43. The device of claim 39, wherein said module capable of wirelessly transferring the images and said application logic module are housed within a unit that is detachable from the device.

44. The device of claim 40, wherein said module capable of wirelessly transferring the images is capable of functioning as a stand-alone personal digital assistant (PDA) device.

45. The device of claim 39, wherein the device facilitates wireless transfer to a particular fulfiller in response to user input.

46. The device of claim 39, wherein the device includes support for wireless uploading the images to a remote host, prior to transfer to the particular fulfiller.

47. The device of claim 39, wherein said module capable of wirelessly transferring the images from the device comprise a GPS-enabled (Global Positioning System-enabled) cellular phone that is detachable from the device.

* * * * *